(12) United States Patent
Kunisa et al.

(10) Patent No.: US 9,290,400 B2
(45) Date of Patent: Mar. 22, 2016

(54) GRANULES AND PROCESS FOR THEIR PRODUCTION

(71) Applicant: ASAHI GLASS COMPANY, LIMITED, Chiyoda-ku (JP)

(72) Inventors: Yasuhiro Kunisa, Tokyo (JP); Nobuhiro Shinohara, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/311,876

(22) Filed: Jun. 23, 2014

(65) Prior Publication Data

US 2014/0302977 A1    Oct. 9, 2014

Related U.S. Application Data

(63) Continuation of application No. PCT/JP2013/054972, filed on Feb. 26, 2013.

(30) Foreign Application Priority Data

Feb. 28, 2012  (JP) ................................. 2012-041234

(51) Int. Cl.
*C03C 6/08* (2006.01)
*C03B 1/00* (2006.01)
(Continued)

(52) U.S. Cl.
CPC ... *C03B 1/00* (2013.01); *C03B 1/02* (2013.01); *C03C 1/02* (2013.01); *C03C 3/091* (2013.01); *Y02P 40/57* (2015.11); *Y10T 428/2982* (2015.01)

(58) Field of Classification Search
CPC ........ C01B 33/20; C01B 33/22; C01B 33/24; C01B 33/26; C03C 1/026

USPC .......................................................... 501/29
See application file for complete search history.

(56) References Cited

U.S. PATENT DOCUMENTS 5,801,115 A  *  9/1998  Albers et al. .................. 502/342
6,124,394 A  *  9/2000  Goto et al. ..................... 524/495
(Continued)

FOREIGN PATENT DOCUMENTS

JP      10-324526      12/1998
JP      2002-201040    7/2002
(Continued)

OTHER PUBLICATIONS

International Search Report issued Jun. 4, 2013 in PCT/JP2013/054972 filed Feb. 26, 2013.

*Primary Examiner* — Noah Wiese
(74) *Attorney, Agent, or Firm* — Oblon, McClelland, Maier & Neustadt, L.L.P.

(57) ABSTRACT

To provide granules which are to be used as raw material for aluminosilicate glass and which are capable of reducing formation of fine powder during the production thereof, and a process for their production. Granules of a glass raw material mixture comprising at least silica sand and aluminum oxide, which are to be used for production of glass, characterized in that when the granules in such a state that the water content is at most 2 mass % are subjected to screening using a sieve having 1 mm openings, D50 representing the volume cumulative median diameter in the particle size distribution curve of particles passed through the sieve, is from 350 to 5,000 μm, and in the particle size distribution curve of water-insoluble components in the granules, the proportion of particles exceeding 50 μm in diameter is at most 6 vol %, and D90 representing the 90% volume cumulative particle diameter from the smaller particle size side is at most 45 μm.

10 Claims, 16 Drawing Sheets

(51) Int. Cl.
*C03C 1/02* (2006.01)
*C03B 1/02* (2006.01)
*C03C 3/091* (2006.01)

(56) References Cited

U.S. PATENT DOCUMENTS

| | | | |
|---|---|---|---|
| 6,360,562 | B1 | 3/2002 | Kodas et al. |
| 7,803,730 | B2 * | 9/2010 | Hockman et al. ............... 501/29 |
| 8,209,999 | B2 * | 7/2012 | Schumacher et al. ......... 65/21.1 |
| 2004/0087433 | A1 | 5/2004 | Herold |
| 2007/0021287 | A1 * | 1/2007 | Hockman et al. ............... 501/27 |
| 2008/0318757 | A1 | 12/2008 | Fotou et al. |
| 2010/0178509 | A1 * | 7/2010 | Schumacher ........... C03B 19/06 428/402 |
| 2012/0144863 | A1 * | 6/2012 | Shinohara et al. ............. 65/21.2 |
| 2014/0075995 | A1 * | 3/2014 | Ando et al. ....................... 65/95 |
| 2014/0130547 | A1 | 5/2014 | Shinohara et al. |

FOREIGN PATENT DOCUMENTS

| | | |
|---|---|---|
| JP | 2007-39324 | 2/2007 |
| JP | 2007-297239 A | 11/2007 |
| JP | 4219816 | 11/2008 |
| JP | 2009-179508 | 8/2009 |
| JP | 2010-132541 | 6/2010 |
| WO | 2011/024913 | 3/2011 |

* cited by examiner

HH: Magnesium hydroxide
II: Fluorite
JJ: Iron oxide

Example 1 (after drying)

Example 1 (<250 µm) (after drying)

Fig. 17  Example 4 (before drying)
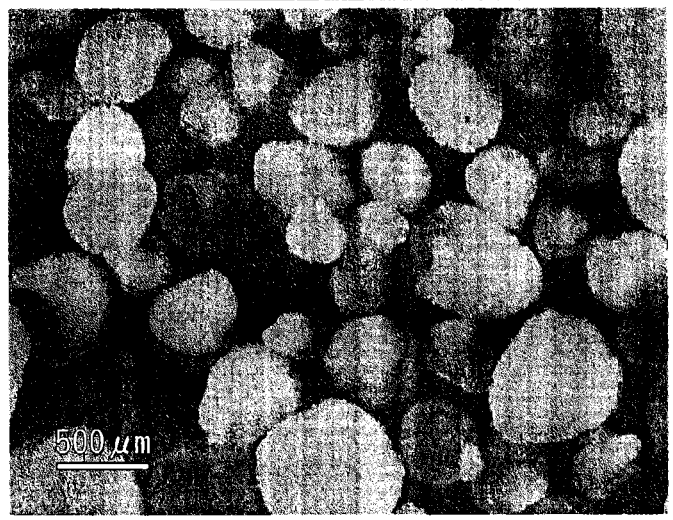
Fig. 18  Example 5 (before drying)
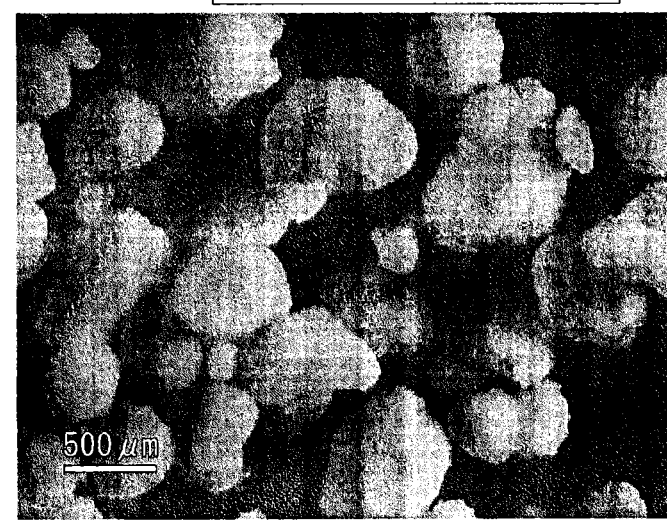

Fig. 19 Comparative Example 1 (before drying)
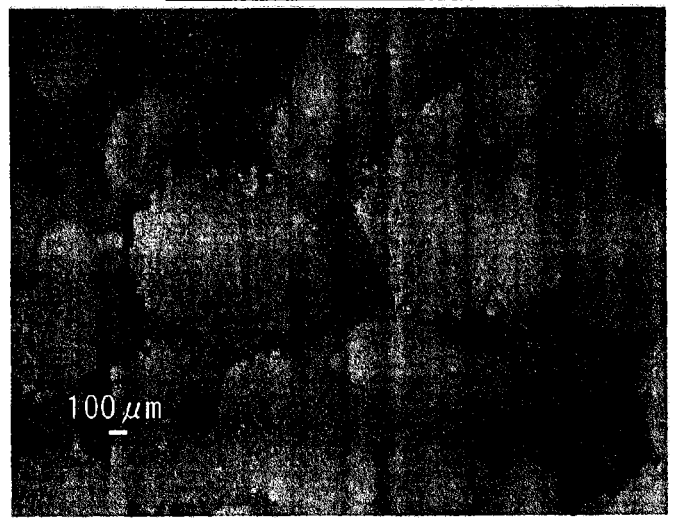
Fig. 20 Comparative Example 1 (after drying)

Fig. 21  Comparative Example 1 (500-1000 μm) (after drying)
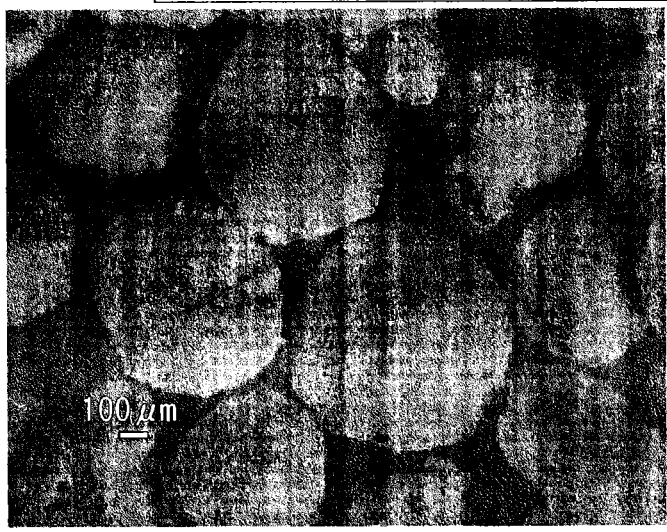
Fig. 22  Comparative Example 1 (<250 μm) (after drying)
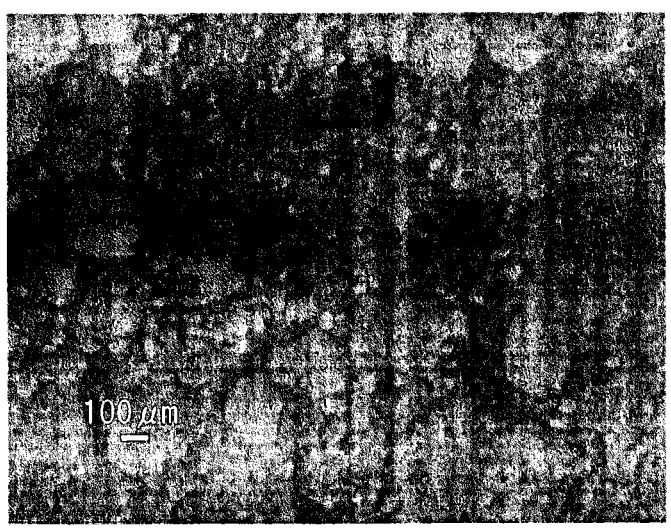

Comparative Example 4 (before drying)

Comparative Example 5 (before drying)

KK: Comparative Example 1
LL: Comparative Example 2
MM: Example 1
NN  Example 2

OO: Example 4
PP: Comparative Example 4
QQ: Comparative Example 6

GRANULES AND PROCESS FOR THEIR PRODUCTION

This application is a continuation of PCT Application No. PCT/JP2013/054972 filed on Feb. 26, 2013, which is based upon and claims the benefit of priority from Japanese Patent Application No. 2012-041234 filed on Feb. 28, 2012. The contents of those applications are incorporated herein by reference in their entireties.

TECHNICAL FIELD

The present invention relates to granules of a glass raw material mixture and a process for their production.

BACKGROUND ART

In the production of glass, if a raw material powder scatters at the time of introducing it into a melting furnace, there will be problems such that the homogeneity of the glass composition tends to deteriorate, and the raw material is wasted. In order to avoid such problems, a method of granulating the raw material powder and using it in the form of granules has been proposed.

The method for producing granules (the granulation method) is mainly a spray dry method as a wet system or a dry granulation method as a quasi-dry system. The spray dry method is a method wherein by means of e.g. a pulverizing and stirring apparatus such as a ball mill, water is supplied to a glass raw material mixture, followed by stirring while pulverizing the glass raw material mixture, to prepare a raw material slurry, and by means of a spraying means such as a spray drier, the raw material slurry is sprayed into a high temperature atmosphere for drying and solidifying, to obtain granules.

In the dry granulation method, the raw material is put into a granulation apparatus of e.g. a stirring and granulating system, and water in an amount of from a few % to a few tens % is added, followed by stirring, whereby the raw material particles are agglomerated to form granule particles, which are aggregated to form granules. After taking out the obtained granules, moisture is removed, as the case requires, and further, screening is carried out to remove coarse particles, as the case requires.

The dry granulation method has no raw material pulverizing step and thus is characterized in that particles used as the raw material would become granules as their size is maintained, and therefore, it is preferentially used to form granule particles having a particle size relatively larger than by the spray dry method. Further as compared with the spray dry method, it is advantageous in that the energy required for drying may be less, and the size of the entire installation is relatively compact so that the granulation installation may be installed in a factory, whereby the costs will be relatively low as no transportation costs by truck, etc. are required.

The following Patent Document 1 discloses a method wherein in order to improve the degree of homogeneity of glass and to reduce defects, a silica raw material powder to be used for the dry granulation method is finely pulverized so that D10 of the obtainable granules is made to be from 5 to 30 times of D90 of the silica raw material powder.

The following Patent Document 2 relates to a method for producing glass by forming calcium magnesium silicate by a solid-state reaction at the time of heating granules of a glass raw material mixture, and discloses that in order to promote the thermodynamic superiority for the solid-state reaction to a standard glass reaction, D90 of a calcium source material to be used for the dry granulation method is made to be less than 75 μm.

PRIOR ART DOCUMENTS

Patent Documents

Patent Document 1: JP-A-2009-179508
Patent Document 2: Japanese Patent No. 4,219,816

DISCLOSURE OF INVENTION

Technical Problem

At the time of producing granules by a dry granulation method, part of raw material particles are present in the form of fine particles (fine powder) in granules without being taken into agglomerated granule particles. Such fine powder is likely to cause formation of bubbles by inclusion of air, etc., powder dust, or striae or non-melted scum in glass blanks.

For example, in a case where glass is produced by an in-flight melting method using granules, the fine powder becomes dust, and such dust is likely to cause blocking of flues of exhaust gas lines or clogging of bag filters, whereby continuous operation will be difficult, such being undesirable.

Further, according to the present inventors' finding, among glass raw materials, aluminum oxide (alumina) and silica sand tend to be fine powders. Alumina and silica sand are hardly melted, and their fine powders are likely to cause formation of a non-melted portion so-called scum at an upper portion of a glass blank, or cause inclusion of bubbles due to the fine powders.

Therefore, in granules to be used as raw material particularly for aluminosilicate glass comprising $SiO_2$ and $Al_2O_3$ as the main components, it is important to reduce the fine powder.

Here, a method of removing the fine powders by screening after the production of granules is also conceivable. However, by this method, the yield of the raw material tends to be poor, and the number of process steps increases thus leading to a high cost.

The present invention has been made under these circumstances, and it is an object of the present invention to provide granules which are granules of a glass raw material mixture to be used as raw material for aluminosilicate glass and which are capable of reducing formation of fine powder at the time of the production of granules and a process for their production.

Solution to Problem

The present invention provides the following constructions.
(1) Granules of a glass raw material mixture comprising at least silica sand and aluminum oxide, which are to be used for production of glass, characterized in that when the granules in such a state that the water content is at most 2 mass % are subjected to screening using a sieve having 1 mm openings, D50 representing the volume cumulative median diameter in the particle size distribution curve of particles passed through the sieve, is from 350 to 5,000 μm, and in the particle size distribution curve of water-insoluble components in the granules, the proportion of particles exceeding 50 μm in diameter is at most 6 vol %, and D90 representing the 90% volume cumulative particle diameter from the smaller particle size side is at most 45 µm.

(2) The granules according to the above (1), wherein the filling rate of the granules is at least 75% as measured by mercury intrusion technique.

(3) The granules according to the above (1) or (2), wherein the bulk density of the granules is at least 1.1 g/ml.

(4) A process for producing granules, which comprises mixing glass raw materials and then, granulating, without pulverizing, the glass raw material mixture, characterized in that the glass raw material mixture comprises at least silica sand and aluminum oxide, and in the particle size distribution curve of water-insoluble components in the glass raw material mixture, the proportion of particles exceeding 50 µm in particle diameter is at most 6 vol %, and D90 representing the 90% volume cumulative particle diameter from the smaller particle size side is at most 45 µm.

(5) The process for producing granules according to the above (4), wherein the method of granulating the glass raw material mixture is a tumbling granulation method.

(6) A method for producing molten glass, which comprises producing granules by the process as defined in (4) or (5) and melting the granules to form molten glass.

(7) A method for producing a glass product, which comprises producing molten glass by the method as defined in the above (6) and using the molten glass.

(8) The method for producing a glass product according to the above (7), wherein the glass composition of the glass product comprises $SiO_2$: from 50 to 60 mass %,
$Al_2O_3$: from 15 to 20 mass %,
$B_2O_3$: from 6 to 10 mass %,
CaO: from 2 to 6 mass %,
MgO: from 1 to 5 mass %,
$Fe_2O_3$: from 0.01 to 0.1 mass %, and
SrO: from 5 to 10 mass %.

(9) The method for producing a glass product according to the above (8), wherein a glass raw material mixture is used which comprises, as water-insoluble components among glass raw materials, from 65 to 75 vol % of silica sand ($SiO_2$) having D50 of from 1 to 30 µm, from 7 to 15 vol % of aluminum oxide having D50 of from 1 to 7 µm, from 0.1 to 10 vol % of magnesium hydroxide having D50 of from 3 to 11 µm, from 5 to 15 vol % of dolomite having D50 of from 5 to 20 µm, from 3 to 15 vol % of strontium carbonate having D50 of from 2 to 10 µm, from 0.1 to 2 vol % of fluorite ($CaF_2$) having D50 of from 5 to 30 µm, and from 0.001 to 0.1 vol % of iron oxide ($Fe_2O_3$) having D50 of from 5 to 50 µm.

Advantageous Effects of Invention

According to the present invention, it is possible to obtain granules which are granules to be used as raw material for aluminosilicate glass and which are capable of reducing formation of fine powder at the time of the production of granules. Further, according to the present invention, it is possible to obtain molten glass using such granules, and a glass product using such molten glass.

BRIEF DESCRIPTION OF DRAWINGS

FIG. 17 is an optical microscopic photograph of granules in Example 4.

FIG. 18 is an optical microscopic photograph of granules in Example 5.

FIG. 19 is an optical microscopic photograph of granules before drying in Comparative Example 1.

FIG. 20 is an optical microscopic photograph of granules after drying in Comparative Example 1.

FIG. 21 is an optical microscopic photograph of particles having particle sizes of at least 500 µm and less than 1,000 µm in granules in Comparative Example 1.

FIG. 22 is an optical microscopic photograph of particles having particle sizes of less than 250 µm in granules in Comparative Example 1.

DESCRIPTION OF EMBODIMENTS

Figure 1:
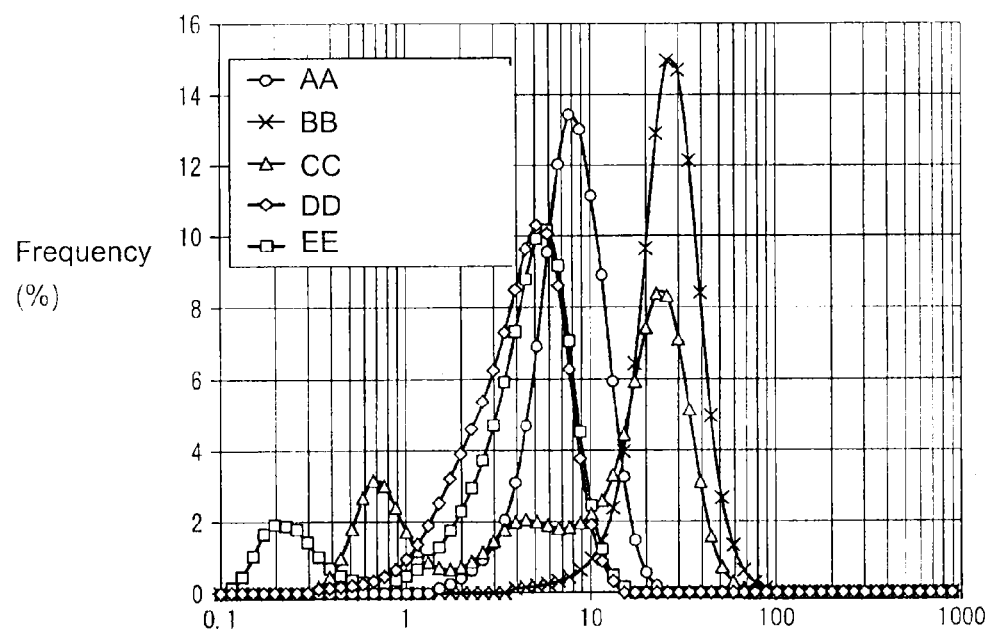
FIG. 1 is a graph showing particle size distribution curves of water-insoluble components in a glass raw material mixture in an Example.

Granules in the present invention are aggregates of granule particles. The granule particles are particles having glass raw material particles integrally agglomerated.

In the present invention, a compound of which the amount to be dissolved in 100 mL of water at 20° C. is at least 1.0 g, is regarded as a water-soluble component, and a compound of which said amount is less than 1.0 g is regarded as a water-insoluble component.

<Glass Composition>

In the present invention, components in glass are represented by oxides such as $SiO_2$, $Al_2O_3$, $B_2O_3$, CaO, MgO, etc., and the contents of the respective components (the glass composition) are represented by the mass proportions (mass %) calculated as the oxides. Further, the glass composition represents the glass composition of solid glass, and the glass composition of molten glass is represented by the glass composition of glass having such molten glass solidified.

The granules of the present invention are to be used for the production of aluminosilicate glass having a glass composition comprising $SiO_2$ and $Al_2O_3$ as the main components.

The aluminosilicate glass is not particularly limited so long as it is one wherein in its composition, $SiO_2$ is contained in an amount of at least 30 mass %, and $Al_2O_3$ is contained in an amount of at least 1 mass %. For example, it may be borosilicate glass containing a boron component, or an aluminosilicate glass. Further, it may be alkali-free glass containing substantially no alkali metal oxide, or may contain an alkali metal oxide. Here, in the present invention, alkali-free glass is meant for glass wherein the content of alkali metal oxides is less than 0.1 mol % (i.e. may be 0 mol %).

The following are examples of preferred glass compositions.

As the glass composition (unit: mass %) of alkali-free borosilicate glass, preferred are $SiO_2$: from 40 to 85%, $Al_2O_3$: from 1 to 25%, $B_2O_3$: from 1 to 20%, MgO: from 0 to 10%, CaO: from 0 to 17%, SrO: from 0 to 24%, BaO: from 0 to 30%, and $R_2O$ (R represents an alkali metal): less than 0.1%, more preferred are $SiO_2$: from 45 to 70%, $Al_2O_3$: from 10 to 22%, $B_2O_3$: from 5 to 16%, MgO: from 0 to 7%, CaO: from 0 to 14%, SrO: from 0.5 to 13%, BaO: from 0 to 15%, and $R_2O$ (R represents an alkali metal): less than 0.1%, particularly preferred are $SiO_2$: from 50 to 60%, $Al_2O_3$: from 15 to 20%, $B_2O_3$: from 6 to 10%, CaO: from 2 to 6%, MgO: from 1 to 5%, $Fe_2O_3$: from 0.01 to 0.1%, and SrO: from 5 to 10%.

As the glass composition (unit: mass %) of borosilicate glass containing alkali metal, preferred are $SiO_2$: from 45 to 85%. $Al_2O_3$: from 2 to 20%, $B_2O_3$: from 1 to 15%, MgO: from 0 to 10%, CaO: from 0 to 10%, SrO: from 0 to 9%, BaO: from 0 to 9%, and $R_2O$ (R represents an alkali metal): from 2 to 15%, more preferred are $SiO_2$: from 50 to 82%, $Al_2O_3$: from 2 to 20%, $B_2O_3$: from 2 to 13%, MgO: from 0 to 5%, CaO: from 0 to 9%, SrO: from 0 to 6%, BaO: from 0 to 2%, and $R_2O$ (R represents an alkali metal): from 4 to 15%.

<Glass Raw Materials>

Glass raw materials are compounds which can become oxides of the glass composition desired to be obtained in the production step for molten glass. Specifically oxides shown in the above glass composition or compounds (such as chlorides, hydroxides, carbonates, sulfates, nitrates, etc.) which can become such oxides by e.g. pyrolysis, are employed.

The composition of a glass raw material mixture is designed to be substantially equal to the desired glass composition as calculated as oxides. In the case of producing glass containing a volatile component such as boron oxide, the composition of a glass raw material mixture is determined in consideration of the volatilization amount of the volatile component during the process for producing glass. For example, a boron source is adjusted to be in an amount larger by an amount corresponding to the volatilization amount than the boron oxide content in the desired borosilicate glass.

At the time of producing granules, the glass raw material mixture is used usually in a powder state. Water-soluble components may be used in a state preliminarily dissolved in water.

As such glass raw materials, known glass raw materials may suitably be used. Examples will be given as follows.

[Silicon Source]

The silicon source is a compound which can become a $SiO_2$ component in the process for producing molten glass. In the present invention, as the silicon source, at least silica sand is used. Although feldspar, etc. may be contained, it is preferred that the silicon source is entirely silica sand. Silica sand is a water-insoluble component.

The content of silica sand in the glass raw material mixture is preferably at least 40 mass %, more preferably at least 45 mass %. The upper limit may be determined depending upon the glass composition to be obtained or the types of the compounds which become oxides to form the glass composition, but may substantially be about 70 mass %.

[Aluminum Source]

The aluminum source is a compound which can become a $Al_2O_3$ component in the process for producing molten glass. Aluminum oxide (alumina), aluminum hydroxide, etc. may preferably be used. One of them may be used alone, or two or more of them may be used in combination. Each of aluminum oxide and aluminum hydroxide is a water-insoluble component.

In the present invention, as the aluminum source, at least aluminum oxide is used. It is preferred that the aluminum source is entirely aluminum oxide.

The content of aluminum oxide in the glass raw material mixture is preferably at least 1 mass %, more preferably at least 5 mass %. The upper limit may be determined depending upon the glass composition to be obtained or the types of the compounds which become oxides to form the glass composition, but may substantially be about 25 mass %.

[Boron Source]

The boron source is a compound which can become a $B_2O_3$ component in the process for producing molten glass. Boric acid such as ortho-boric acid ($H_3BO_3$), meta-boric acid ($HBO_2$) or tetra-boric acid ($H_2B_4O_7$) is preferably used. Among them ortho-boric acid is preferred, since it is inexpensive and readily available. Further, boric acid and a boric source other than boric acid may be used in combination. The boron source other than boric acid may, for example, be boron oxide ($B_2O_3$) or colemanite. One of them may be used alone, or two or more of them may be used in combination.

Among them, a water-soluble component is boric acid or boron oxide, and a water-insoluble component is colemanite. Colemanite is a boron source and is also a calcium source.

[Magnesium Source]

The magnesium source is a compound which can become a MgO component in the process for producing molten glass. A carbonate, sulfate, nitrate, oxide, hydroxide chloride or fluoride of magnesium may be mentioned. One of them may be used alone, or two or more of them may be used in combination.

Among them, a water-soluble component is $MgSO_4$, $Mg(NO_3)_2$ or $MgCl_2$, and a water-insoluble component is $MgCO_3$, MgO, $Mg(OH)_2$ or $MgF_2$. $MgSO_4$, $Mg(NO_3)_2$ and $MgCl_2$ are usually present in the form of hydrates. Such hydrates are $MgSO_4.7H_2O$, $Mg(NO_3)_2.6H_2O$, and $MgCl_2.7H_2O$.

Among the above-mentioned magnesium sources, magnesium chloride, magnesium sulfate and magnesium fluoride are clarifying agents.

Further, dolomite (ideal chemical composition: $CaMg(CO_3)_2$) may also be used. Dolomite is a magnesium source and is also a calcium source. Dolomite is a water-insoluble component.

[Alkaline-Earth Metal Source]

The alkaline-earth metal in the present invention is meant for Sr, Ca or Ba. The alkaline-earth metal source is a compound which can become SrO, CaO or BaO in the process for producing molten glass. As the alkaline-earth metal source, a carbonate, sulfate, nitrate, oxide, hydroxide, chloride or fluoride of an alkaline-earth metal may be mentioned. One of them may be used alone, or two or more of them may be used in combination.

Among them, a water-soluble component is a chloride or nitrate of each alkaline-earth metal, barium hydroxide $Ba(OH)_2.8H_2O$, or strontium hydroxide $Sr(OH)_2.8H_2O$, and a water-insoluble component is calcium hydroxide $Ca(OH)_2$, or a carbonate, sulfate or fluoride of each alkaline-earth metal. The oxide will react with water to form a hydroxide.

The sulfate, chloride or fluoride of the alkaline-earth metal (Sr, Ca or Ba) is also a clarifying agent.

[Iron Source]

$Fe_2O_3$ may be incorporated as a coloring component. When the total iron content calculated as $Fe_2O_3$ in glass is at least 0.001 mass %, a glass plate having a blue or green color tone with sufficient transmitted light is obtainable. When the total iron content calculated as $Fe_2O_3$ is at most 5 mass %, the visible light transmittance of glass will be good. The total iron content calculated as $Fe_2O_3$ is preferably from 0.005 to 4 mass %, more preferably from 0.01 to 3 mass %.

In this specification, the total iron content is represented by an amount of $Fe_2O_3$ in accordance with a standard analytical method, but it should be understood that iron present in glass may not all be present as trivalent iron, i.e. bivalent iron may also be present.

<Process for Producing Granules>

The process for producing granules of the present invention comprises mixing glass raw materials and then, granulating, without pulverizing, the glass raw material mixture. In the present invention, the glass raw material mixture contains at least silica sand and aluminum oxide.

The glass raw material mixture to be supplied for granulation may contain, as auxiliary materials in addition to glass raw materials, a clarifying agent, a coloring agent, a melting assistant, an opacifier, etc. Further, as components required for granulation (granulation components), a binder, a dispersing agent, a surfactant, etc. may, for example, be incorporated. As such auxiliary materials or granulation materials, known components may suitably be used.

In the dry solids content in the glass raw material mixture to be supplied for granulation, the proportion occupied by glass raw materials is preferably at least 90 mass %, more preferably at least 95 mass %. It may be 100 mass %.

The granules of the present invention is produced by mixing necessary all glass raw materials to prepare a glass raw material mixture and granulating the glass raw material mixture (which may contain auxiliary materials, etc. as mentioned above) by suitably using a known granulation method. In a case where a granulation method using water is to be employed, water-soluble glass raw materials may be incorporated in the form of an aqueous solution in the glass raw material mixture.

In the process for producing granules of the present invention, glass raw materials which have been preliminarily pulverized to necessary particle sizes, are used. Therefore, after mixing glass raw materials, granules are produced without positively conducting an operation to change the particle sizes of glass raw materials. As such a production method, a tumbling granulation method, a stirring granulation method, a fluidized bed granulation method or an extrusion granulation method may, for example, be mentioned. Among them, a tumbling granulation method may be conveniently used, since mixing and granulation can thereby be continuously carried out.

As a tumbling granulation method, preferred is, for example, a method wherein glass raw materials are put into a vessel of a tumbling granulation apparatus and granulated by spraying a predetermined amount of water, while being mixed, tumbled and stirred by vibrating and/or rotating the interior of the vessel. As a tumbling granulation apparatus, for example, Eirich Intensive Mixer (tradename, manufactured by Nippon Eirich Co., Ltd.) or Loedige Mixer (tradename, manufactured by Loedige) may be mentioned.

The granules obtained by the granulation process may be heated and dried to remove moisture as the case requires. Further, as the case requires, screening may be carried out by means of a sieve having x mm openings ($x \geq 1$) to remove coarse particles.

Here, in a case where there is no step of e.g. pulverization to positively change the particle size distribution of the glass raw material particles, the particle sizes in the respective glass raw material particles at the time of mixing and the particle sizes in the obtained granules are considered to substantially agree to each other, except for particles having particularly low strength. Therefore, in the case of silica sand, the particle size distribution of silica sand in granules is considered to be substantially equal to the particle size distribution of silica sand used as a glass raw material, and if its particle size distribution is measured before mixing it with other glass raw materials, the measured value may be used as the particle size distribution of silica sand particles in granules.

In the present invention, in the particle size distribution curve of water-insoluble components in the granules, the proportion of particles exceeding 50 μm in diameter (hereinafter sometimes referred to also as "(a) proportion of particles of water-insoluble components exceeding 50 μm in diameter") is at most 6 vol %. Such (a) proportion of particles of water-insoluble components exceeding 50 μm in diameter is preferably at most 4 vol %, more preferably at most 2 vol %.

The particle size distribution curve of water-insoluble components in the glass raw material mixture is a particle size distribution curve of the entire water-insoluble components contained in the glass raw material mixture and is meant for one having particle size distribution curves (based on volume) of the respective water-insoluble components combined, based on the respective content ratios (based on volume) in the glass raw material mixture (hereinafter sometimes referred to as a combined particle size distribution curve).

In the present invention, the particle size distribution curve of water-insoluble components is measured by using a laser diffraction scattering method in a wet system. The wet system is meant for a method of measuring the particle size distribution by using a laser diffraction scattering method in such a state that a powder sample is dispersed in a proportion of from 0.01 to 0.1 g per 100 mL of water at 20° C. (hereinafter sometimes referred to as a wet system measuring method). Here, in the particle size distribution curve measured by a laser diffraction scattering method in a wet system, components soluble in water under the above conditions are not included.

The content ratios based on volume, of water-insoluble components in the glass raw material mixture are obtained by calculation from the blend ratios based on volume, of the respective water-insoluble components used as glass raw materials and the density values of the respective water-insoluble components. As the density values, literature data may be employed.

Further, in the present invention, D90 in the particle size distribution curve of the entire water-insoluble components in the glass raw material mixture (in the combined particle size distribution curve) (hereinafter sometimes referred to as "(b2) D90 of water-insoluble components") is at most 45 μm. Such (b) D90 of water-insoluble components is preferably at most 40 μm, more preferably at most 38 μm.

In the present invention, D50 of water-insoluble components is the 50% volume cumulative median diameter in the particle size distribution curve measured by a laser diffraction scattering method by means of a wet system measuring method. Further. D90 represents the particle size at a cumulative volume of 90% from the smaller particle size side in the particle size distribution curve.

The wet system at the time of measuring the particle size distribution is meant for measurement of the particle size distribution by using a laser diffraction scattering method in such a state that a powder sample is dispersed in a proportion of from 0.01 to 0.1 g per 100 mL of water at 20° C. Here, in the particle size distribution curve measured by a laser diffraction scattering method in a wet system, components dissolved in water under the above conditions are not included.

By reducing (a) the proportion of particles exceeding 50 μm in diameter in water-insoluble components to the above range, and reducing (b2) D90 of water-insoluble components to the above range, it is possible to prevent formation of fine powder during the production of granules.

The reason is considered to be as follows. In a dry system granulation method, when water is added to a glass raw material powder, followed by stirring, a liquid bridge force and a van der Waals force will work as forces to bind raw material particles to one another, and a gravity force and a centrifugal force will work as forces to separate particles from one another. The liquid bridge force is stronger than the van der Waals force as the binding force, and the centrifugal force is stronger than the gravity force as the separating force.

The gravity force or the centrifugal force is more susceptible to an influence of the particle size than the liquid bridge force or the van der Waals force, and therefore, in the case of particles having a large particle size, the effect of the force to separate particles from one another, such as the gravity force or the centrifugal force, tends to be large, and in the case of particles having a small particle size, the effect of such a force to separate particles from one another tends to be small. Therefore, it is considered that if the particle size is made to be smaller to a certain extent, the effect of the liquid bridge force or the van der Waals force to bind particles to one another tends to be larger than the gravity force or the centrifugal force, whereby the particles tend to be more readily taken into granules.

Accordingly, it is considered possible to reduce formation of fine powder in the process for producing granules by selectively use raw material particles which are small in diameter and which are readily taken into granules, so that water-insoluble component particles having a relatively large particle size i.e. raw material particles whereby the effect of the gravity force or the centrifugal force tends to be large so that they tend to be hardly taken into granules, will be little, and D90 of the entire particles of water-insoluble components will be at most 45 μm.

In order to bring (a) the proportion of particles exceeding 50 μm in diameter and (b2) D90 of water-insoluble components to be within the above preferred ranges, D50 in the particle size distribution curve of the entire water-insoluble components in the glass raw material mixture, is preferably from 5 to 30 μm, more preferably from 5 to 25 μm.

D50, by a wet system measuring method, of silica sand to be used as a glass raw material is preferably from 1 to 30 μm, more preferably form 1 to 26 μm.

D50, by a wet system measuring method, of aluminum oxide is preferably from 1 to 10 μm, more preferably form 1 to 5 μm.

In a case where dolomite is to be used as a glass raw material, D50 thereof, by a wet system measuring method, is preferably from 1 to 30 μm, more preferably form 1 to 15 μm.

<Granules>

The granules of the present invention are granules which comprises at least silica sand and aluminum oxide and which are to be used for the production of glass. Further, the granules of the present invention are ones obtainable by granulating a raw material composition containing a plurality of glass raw materials. That is, the granules are granules of a glass raw material mixture comprising a plurality of glass raw materials, which can become glass having the desired glass composition.

The process for producing glass using the granules of the present invention may be one which has a glass melting step of heating and melting the granules to form molten glass. The glass melting step may be carried out by a common melting method using e.g. a Siemens type glass melting furnace or by an in-flight melting method. Either method may be conducted by a known method.

In the in-flight melting method, water vapor to be generated in the in-flight melting furnace is preferably little. Therefore, granules to be used for the in-flight melting method are produced via a drying step after the granulation step. The moisture content in the granules to be used for the in-flight melting method is preferably at most 2 mass %, more preferably at most 1 mass %.

On the other hand, the moisture content in the granules to be used for the common melting method is not limited, and the drying step after the granulation stop is optional. In the common melting method, with a view to reducing the load on the furnace by reducing the amount of water vapor to be generated in the melting furnace, the moisture content in the granules to be used for the common melting method is preferably at most 5 mass %, more preferably at most 3.5 mass %.

The moisture content in the present invention is a moisture content [unit: mass %] obtainable by measuring the mass reduction at the time of drying from 15 to 20 g of granules at 120° C. for 30 minutes by means of a KETT moisture meter (tradename: ML-50, manufactured by A&D Company, Limited, measuring system: heat drying/mass measuring system).

The granules of the present invention are characterized in that when the granules in such a state that the water content is at most 2 mass % are subjected to screening using a sieve having 1 mm openings, D50 in the particle size distribution curve of particles passed through the sieve (hereinafter sometimes referred to as "(c) D50 of granules"), is from 350 to 5,000 μm.

In the present invention, the particle size distribution curve of granules is measured by using a laser diffraction scattering method in a dry system. The dry system is meant for a method of measuring the particle size distribution by using a laser diffraction scattering method with respect to a powder sample (hereinafter sometimes referred to as a dry system measuring method).

In the present invention, D50 is a median diameter at a cumulative volume of 50% in the particle size distribution curve measured by using a laser diffraction scattering method by means of a dry system measuring method with respect to particles passed through the above-mentioned sieve. Further, D90 represents the particle size at a cumulative volume of 90% from the smaller particle size side in the particle size distribution curve.

Here, the particle size of granules may change depending upon the moisture content, but in a dried state where the moisture content is at most 2 mass %, the particle size will not substantially change even if the moisture content changes.

For example, in a tumbling granulation method, D50 of granules may be adjusted by e.g. the granulation time, the rotational speed of the rotor or chopper, the amount of water to be added, the temperature of the granulation vessel (such as a pan), etc. When D50 of granules is within the above range, it is easily possible to sufficiently reduce fine powder having a particle size of at most 100 μm, whereby powder dust is less likely to be formed, and the handling efficiency will be also good. Further, clue to proper clearances among granules during the production of glass, removal of air bubbles tends to be facilitated and inclusion of bubbles will be prevented.

Here, the above range of D50 of granules is a range which can be accomplished by using a dry system granulation method wherein granulation is carried out while mixing and stirring the raw material composition and is a range which can hardly be accomplished by a spray dry method.

The lower limit value for (c) D50 of granules is preferably 500 μm, more preferably 550 μm, with a view to preventing formation of fine powder to cause powder dust. The upper limit for (c) D50 of granules may be determined depending upon the production conditions such as the rotational speed of the rotor of the granulation machine but is preferably 4,000 μm, more preferably 3,500 μm, to avoid the production time from becoming too long.

The granules of the present invention are such that in the particle size distribution curve of the entire water-insoluble components in the granules (in the combined particle size distribution curve), the water-insoluble components exceeding 50 μm in diameter are at most 6 vol %, and D90 representing the particle size at a cumulative volume of 90% from the smaller particle size side is at most 45 μm.

Preferably, they are granules obtainable by a production process which is the above-described process for producing granules, i.e. the process for producing granules which comprises mixing glass raw materials and then granulating the glass raw material mixture without pulverizing it, wherein the glass raw material mixture comprises at least silica sand and aluminum oxide, (a) the proportion of particles exceeding 50 μm in diameter of water-insoluble components in the glass raw material mixture is at most 6 vol %, and (b) D90 of water-insoluble components is at most 45 μm.

Particle size distributions of the respective water-insoluble components present in granules may be measured by the following method. Firstly, a cross-section of the granules is observed by an electron probe microanalyzer (hereinafter referred to also as EPMA), whereby the respective water-insoluble components in granules are respectively distinguished, and their particle sizes are measured by a method disclosed in JIS R 1670. The particle size distributions measured by this method of using EPMA are number-based, and therefore, they are converted to volume-based particle size distributions by using the Scwartz-Saltykov method.

The Scwartz-Saltykov method is known as disclosed in a literature "Nobuyasu Mizutani et. al. "Ceramic Processing" pp. 195-201, published by Gihodo Shuppan Co. Ltd., 1985".

Further, the component composition of the granules is quantitatively analyzed by a fluorescent X-ray analysis to obtain the content ratios (unit: vol %) of the respective water-insoluble components in the entire water-insoluble components in the granules.

Based on the particle size distributions and contents with respect to the respective water-insoluble components, the particle size distribution curves of the respective water-insoluble components are combined to obtain a particle size distribution curve of the entire water-insoluble components in the granules (i.e. a combined particle size distribution curve), and based on the combined particle size distribution curve, the content of water-insoluble components exceeding 50 μm in diameter and D90 of the entire water-insoluble components in the granules, are obtained.

For example, in a case where silica sand is taken as an example, with respect to from 3 to 5 granule particles optionally selected from granules, from comparison of the results of EPMA element color mapping with a usual electron microscopic image, silica sand particles in the electron microscopic image are specified, and with respect to about 100 silica sand particles, equivalent circle diameters (particle sizes) stipulated in JIS R-1670 (Method for measuring grain sizes of fine ceramics) are measured. Then, using the Schwartz-Saltykov method, from the distribution of the obtained equivalent circle diameters (the particle size distribution), a distribution of diameters of spheres (particles) is calculated. Further, it is converted to a volume-based particle size distribution by obtaining the volumes of the spheres (particles) from the diameters of spheres (particles).

Also with respect to other water-insoluble components, the volume-based particle distributions are obtainable in the same manner.

Further, in granules produced by the granulation method having no pulverization step, particles of water-insoluble components used as raw materials are present in the granules as their sizes are maintained. Therefore, in a case where particle size distributions of the respective water-insoluble components used for the production of granules are known, such particle size distributions may be used as the particle size distributions of the respective water-insoluble components in the granules.

Further, in a case where the contents of the respective water-insoluble components in the raw material composition are known, it is possible to obtain, based thereon, the content ratios of the respective water-insoluble components in the entire water-insoluble components in the granules.

Further, the particle size distributions (based on volume) of the respective water-insoluble components obtainable by the above-mentioned method using EPMA, and the particle size distributions (based on volume), by the wet system measuring method, of the respective water-insoluble components used as glass raw materials, are substantially the same. Especially, by increasing the number of particles to be measured by EPMA, the difference between them can be minimized.

With the granules of the present invention, the proportion of water-insoluble components exceeding 50 μm in diameter is low, and D90 of the entire water-insoluble components is small, whereby, as mentioned above, formation of fine powder during the production is reduced, and it is possible to increase the filling rate and bulk density of the granules and to improve their strength.

The reason is such that raw material particles having small particle sizes tend to be readily taken into granules and at the same time, tend to readily penetrate into clearances among other raw material particles having relatively large particle sizes in the granules. Thus, it is considered that the clearances in the granules will be thereby reduced, and the filling rate and bulk density will be increased and the strength will be improved. When the strength of the granules is high, formation of powder dust during their use can be prevented.

The granules of the present invention are preferably such that the filling rate as measured by mercury intrusion technique is at least 75%. Further, the granules of the present invention are preferably such that the bulk density is at least 1.1 g/ml. Further, the granules of the present invention are particularly preferably such that the filling rate as measured by mercury intrusion technique is at least 75%, and the bulk density is at least 1.1 g/ml.

Here, such high filling rate and high bulk density are levels which can be accomplished by using the dry granulation method of granulating the raw material composition while mixing and stirring them, and in ranges which cannot be attained by a spray dry method.

The filling rate is preferably high, more preferably at least 78%, since good strength of granules is thereby readily obtainable. The upper limit of the filling rate is not particularly limited, but is substantially at a level of at most 85%.

The bulk density is preferably high, more preferably at least 1.14 g/ml, since good strength of granules is thereby readily obtainable. The upper limit of the bulk density is not particularly limited, but is substantially at a level of at most 1.4 g/ml.

In the present invention, the filling rate as measured by mercury intrusion technique, of granules is a value calculated by Filling rate (%)=100−porosity (%)

wherein the porosity is obtained by the following formula (i) using a value of a pore volume measured by mercury intrusion technique.

In the following formula (i), the material density is the density of the material constituting the granules, and here, the density of the mixture of raw materials (the glass raw material mixture used for granulation) was obtained by calculation from literature values of the densities of the respective raw materials used for granulation and the content ratios of the respective raw materials, and used as the material density.

$$\text{Porosity [\%]} = \frac{\dfrac{\text{Pore volume [mm}^3\text{/g]}}{1000}}{\dfrac{\text{Pore volume [mm}^3\text{/g]}}{1000} + \dfrac{1}{\text{Material density [g/cm}^3\text{]}}} \times 100 \qquad (i)$$

Further, with the granules of the present invention, the proportion of water-insoluble components exceeding 50 μm in diameter is low, and D90 of the entire water-insoluble components is small, whereby it is possible to reduce the amount of water to be added during granulation.

The reason is considered to be such that when raw material particles having small particle sizes can penetrate into clearances among other raw material particles, even if a liquid bridge force as a force to bind particles to one another is deficient, such deficiency can be complemented by a van der Waals force of adjacent particles to one another, whereby good granulation can be conducted even when the amount of water to be added is reduced. When the amount of water to be added is small, it becomes possible to obtain such merits as shortening of the drying time, reduction of the load on the drier, etc.

In a conventional dry granulation method, the proportion of water added (the amount of water to be added) was from about 10.5 to 14 mass % in the total of all components to be supplied for stirring and mixing. Whereas, in the present invention, it is preferred to adjust the amount of water to be added to a level of from 6.5 to 10 mass %.

When the amount of water to be added in the dry granulation method is at least 6.5 mass %, a liquid bridge force to bind particles to one another is well obtainable, and formation of fine powder tends to be prevented well. When it is at most 10 mass %, agglomeration or excessive growth of granules tends to be prevented well. Further, it is possible to prevent the viscosity from becoming high during granulation, and good fluidity tends to be secured.

Further, with the granules of the present invention, it is possible to improve the homogeneity of the composition in the granules. That is, as shown in Examples given hereinafter, with a composition in a fine powder region with a small particle size, deviation from the desired composition tends to be large, as compared with other regions. According to the present invention, formation of fine powder during the production is prevented, whereby the proportion of particles in a region where deviation from the desired composition is large, can be reduced, and the homogeneity of the composition in the entire granules will be improved.

Further, as shown in Examples given hereinafter, in a case where aluminum oxide and dolomite are contained in the glass raw material mixture, although the reason is not clearly understood, when both of aluminum oxide and dolomite are changed to ones having small particle sizes, rather than changing only aluminum oxide to one having a small particle size, it is possible to bring the composition in a fine powder region close to the desired composition.

Further, as shown in Examples given hereinafter, in a case where aluminum oxide and dolomite are contained in the glass raw material mixture, although the reason is not clearly understood, the growth of particles will be accelerated by using one having a small average particle size as aluminum oxide and/or dolomite. This is considered to be such that a glass raw material having a small particle size is superior in a liquid bridge force or a van der Waals force rather than in a separation force such as a centrifugal force or a gravity force and thus tends to be readily taken into granules as nuclei.

The following is a preferred example of the granules of the present invention.

Granules of which the desired glass composition comprises $SiO_2$: from 50 to 60 mass %,
$Al_2O_3$: from 15 to 20 mass %,
$B_2O_3$: from 6 to 10 mass %,
CaO: from 2 to 6 mass %,
MgO: from 1 to 5 mass %,
$Fe_2O_3$: from 0.01 to 0.1 mass %,
$SO_3$: from 0.1 to 2 mass %,
SrO: from 5 to 10 mass %, and
Cl: from 0.1 to 2 mass %, and which comprises, as water-insoluble components, from 65 to 75 vol % of silica sand ($SiO_2$) having D50 of from 1 to 30 μm, from 7 to 15 vol % of aluminum oxide having D50 of from 1 to 7 μm, from 0.1 to 10 vol % of magnesium hydroxide having D50 of from 3 to 11 μm.

from 5 to 15 vol % of dolomite having D50 of from 5 to 20 μm, from 3 to 15 vol % of strontium carbonate having D50 of from 2 to 10 μm, from 0.1 to 2 vol % of fluorite ($CaF_2$) having D50 of from 5 to 30 μm, and from 0.001 to 0.1 vol % of iron oxide ($Fe_2O_3$) having D50 of from 5 to 50 μm.

<Method for Producing Molten Glass>

The method for producing molten glass of the present invention comprises producing granules by the above-described process and melting the granules to form molten glass.

As the granules to be used for the production of molten glass, it is preferred to produce the granules by using a glass raw material mixture which comprises, as water-insoluble components among glass raw materials, from 65 to 75 vol % of silica sand ($SiO_2$) having D50 of from 1 to 30 μm, from 7 to 15 vol % of aluminum oxide having D50 of from 1 to 7 μm, from 0.1 to 10 vol % of magnesium hydroxide having D50 of from 3 to 11 μm, from 5 to 15 vol % of dolomite having D50 of from 5 to 20 μm, from 3 to 15 vol % of strontium carbonate having D50 of from 2 to 10 μm.

from 0.1 to 2 vol % of fluorite ($CaF_2$) having D50 of from 5 to 30 μm, and from 0.001 to 0.1 vol % of iron oxide ($Fe_2O_3$) having D50 of from 5 to 50 μm.

<Method for Producing Glass Product>

Further, the method for producing a glass product of the present invention comprises using the molten glass obtained by the method for producing molten glass of the present invention. Preferably, the obtained molten glass is molded and annealed to obtain a glass product. Here, the glass product is meant for an article wherein glass which is solid and has substantially no fluidity at room temperature, is used as a part or whole thereof, and includes, for example, one having the glass surface processed.

Specifically, firstly the molten glass obtained by the above method for producing molten glass is molded to have a desired shape and then annealed. Thereafter, as the case requires, post treatment such as cutting, polishing or the like is applied by a known method in a post treatment step, to obtain a glass product.

The molding may be carried out by a known method, such as a float process, a down-draw method or a fusion method. The float process is a method for forming molten glass on molten tin into a plate form.

The annealing may also be carried out by a known method.

The glass composition of the glass product obtainable by the production method of the present invention preferably comprises $SiO_2$: from 50 to 60 mass %,
$Al_2O_3$: from 15 to 20 mass %,
$B_2O_3$: from 6 to 10 mass %,
CaO: from 2 to 6 mass %,
MgO: from 1 to 5 mass %,
$Fe_2O_3$: from 0.01 to 0.1 mass %,
$SO_3$: from 0.1 to 2 mass %,
SrO: from 5 to 10 mass %, and
Cl: from 0.1 to 2 mass %.

EXAMPLES

The present invention will be described in further detail with reference to Examples, but it should be understood that the present invention is by no means limited to these Examples. As measuring methods, the following methods were employed.

For the measurement of a particle size distribution curve, in a dry system measuring method, a laser diffraction scattering particle diameter/particle size distribution measuring apparatus (Microtrac MT 3200, tradename, manufactured by Nikkiso Co., Ltd.) was used, and in a wet system measuring method, a laser diffraction scattering particle size distribution measuring apparatus (LA-950V2, tradename, manufactured by Horiba, Ltd.) was used.

Figure 2:
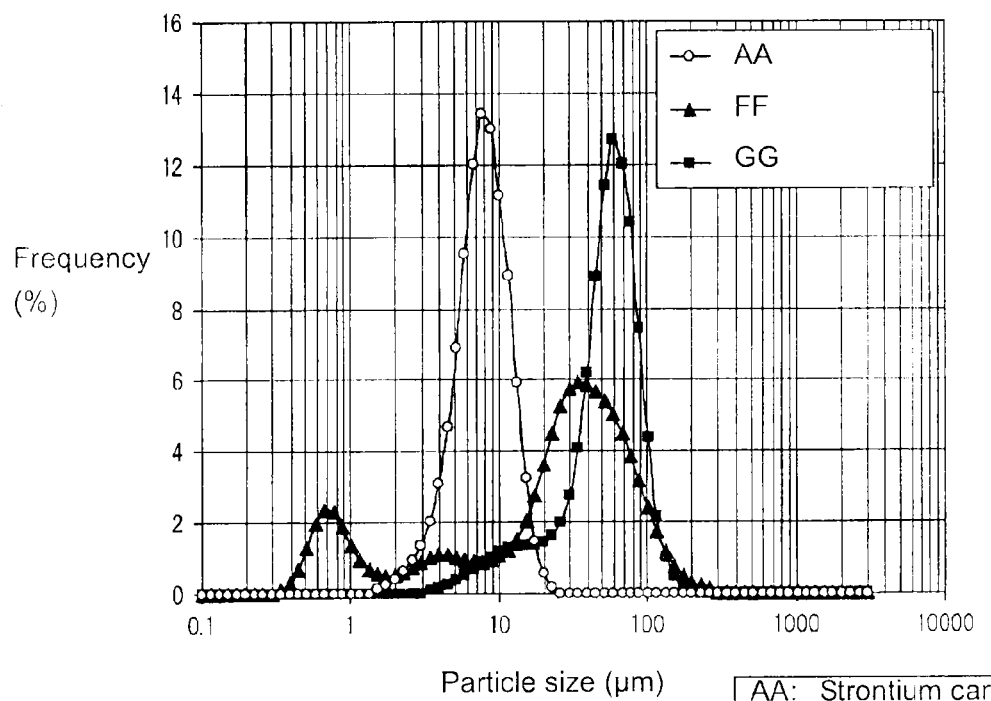
FIG. 2 is a graph showing particle size distribution curves of water-insoluble components in a glass raw material mixture in an Example.
Figure 3:
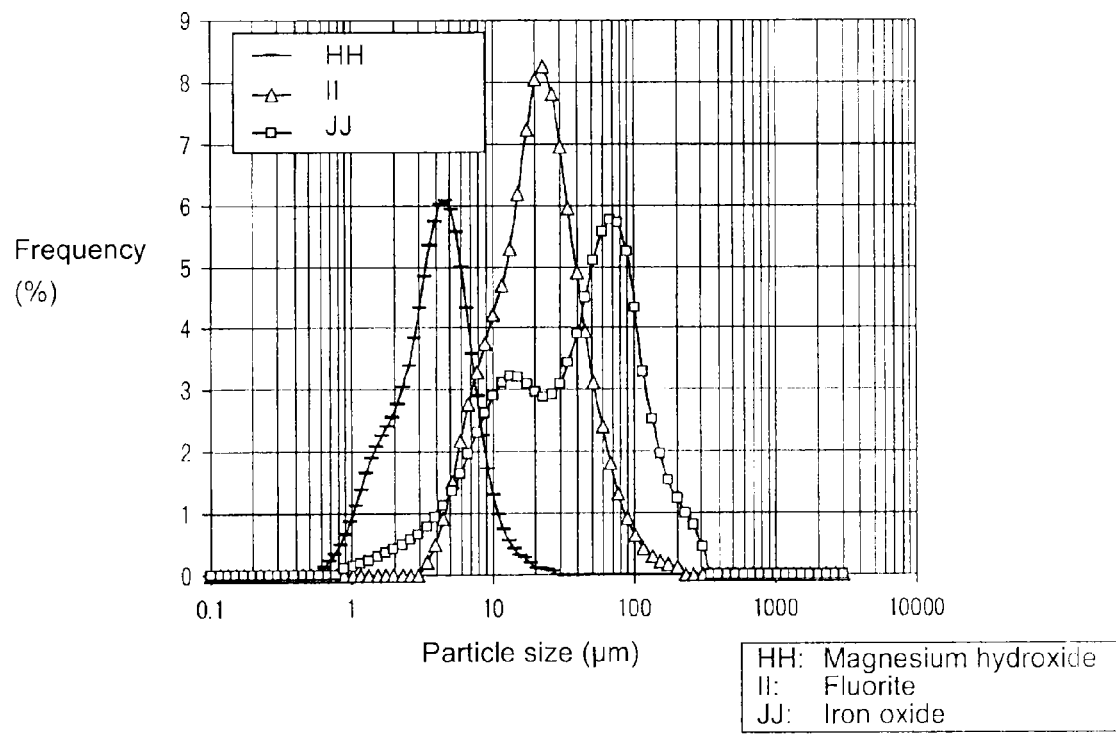
FIG. 3 is a graph showing particle size distribution curves of water-insoluble components in a glass raw material mixture in an Example.

(a) Proportion of Particles Exceeding 50 μm in Diameter, in Water-Insoluble Components With respect to water-insoluble components in the glass raw material mixture, the respective particle size distribution curves (based on volume) were obtained by a wet system measuring method. The obtained particle size distribution curves of the respective water-insoluble components are shown in FIGS. 1 to 3.

Based on the content ratios [unit: vol %] of the respective water-insoluble components in the total of water-insoluble components in the glass raw material mixture, the particle size distribution curves (based on volume) of the respective water-insoluble components obtained as described above, were combined to obtain a particle size distribution curve of the total of water-insoluble components in the glass raw material mixture (a combined particle size distribution curve). From volume accumulation in the combined particle size distribution curve (based on volume), the proportion [unit: vol %] of the total of water-insoluble component particles exceeding 50 μm in diameter was obtained.

Here, the volume-based content ratios of the respective water-insoluble components in the glass raw material mixture were obtained by calculation from the mass-based content ratios and the densities [unit: $g/cm^3$].

(b1) D50 of Water-Insoluble Components, and (b2) D90 of Water-Insoluble Components Based on the content ratios [unit: vol %] of the respective water-insoluble components in the total of water-insoluble components in the glass raw material mixture, the particle size distribution curves (based on volume) of the respective water-insoluble components obtained as described above, were combined to obtain a particle size distribution curve of the total of water-insoluble components in the glass raw material mixture (a combined particle size distribution curve). The volume cumulative D50 and D90 in the combined particle size distribution curve (based on volume) were, respectively, taken as (b1) D50 of water-insoluble components, and (b2) D90 of water-insoluble components.

(c) D50 of Granules, and (d) Fine Powder Rate During Compressed-Air Spraying

Granules after drying to a water content of at most 2 mass % were subjected to screening using a sieve having 1 mm openings, and with respect to particles passed through the sieve, the particle distribution curve was measured by a dry system measuring method. By means of the above-mentioned particle size distribution measuring apparatus (Microtrac MT3200), the particle size distribution curves (based on volume) were measured, respectively, with respect to a case where no compressed air was sprayed (compressed air pressure: 0 psi (0 kPa)) and a case where compressed air of 50 psi (0.35 MPa) was sprayed, to the granules immediately before being put into the measuring chamber of the particle size distribution measuring apparatus. If the compressed air is sprayed to the granules, granules weak in strength tend to be broken, or peripheral particles are likely to be exfoliated to increase fine powder.

D50 representing the volume cumulative median diameter was obtained from the particle size distribution curve in the case where no compressive air was sprayed (compressed air pressure: 0 psi (0 kPa)).

In the particle size distribution curve in the case where compressed air of 0.35 MPa was sprayed, the volume ratio of less than 50 μm was calculated as the fine powder rate [unit: vol %]. As the fine powder rate is higher, the granules are more likely to be broken, or particles attached to the periphery of granules or particles constituting the outer periphery of granules are more likely to be exfoliated.

(e) Filling Rate of Granules

With respect to the granules after drying to a water content of at most 2 mass % and before screening by the sieve of 1 mm, the filling rate [unit: %] of the granules by mercury intrusion technique was obtained by the above-mentioned mercury intrusion technique by means of a mercury porosimeter (manufactured by Thermo Fisher Scientific Inc., tradename: PASCAL 140/440).

(f) Bulk Density of Granules

With respect to the granules after drying to a water content of at most 2 mass % and before screening by the sieve of 1 mm, the bulk density [unit: g/mL] was obtained by a method in accordance with JIS K6720.

(g) Proportions of Fine Powders in Granules ((g1) and (g2))

With respect to the granules after drying to a water content of at most 2 mass % and before screening by the sieve of 1 mm, the particle size distribution (based on mass) was measured by a sieving method by means of an automatic sieving measuring apparatus (tradename: Robot Shifter, RPS-85, manufactured by Seishin Enterprise Co., Ltd.). That is, the granules were sieved to particle size ranges of less than 106 μm, at least 106 μm and less than 250 μm, at least 250 μm to less than 500 μm, at least 500 μm to less than 710 μm, at least 710 μm to less than 1,000 μm, at least 1 mm and less than 1.7 mm, and at least 1.7 mm. In the total of these particles, (g1) the proportion [unit: mass %] of fine powder with a particle size of less than 106 μm and (g2) the proportion [unit: mass %] of fine powder with a particle size of less than 250 μm were obtained.

The fine powder of less than 250 μm is the total of the particles in a particle size range of less than 106 μm and the particles in a particle size range of at least 106 μm and less than 250 μm.

<Glass Raw Materials>

The blend ratios [unit: mass %] of glass raw materials used in the following Examples and Comparative Examples, and D50, D90 and the density of each raw material, are as shown in Tables 1 and 2. D50 and D90 of raw material are values obtained by a wet system measuring method.

In each of Examples and Comparative Examples in Tables 1 and 2, the desired composition of granules was as follows: $SiO_2$: 57.7 mass %, $Al_2O_3$: 16.8 mass %, $B_2O_3$: 9.3 mass %, CaO: 3.9 mass %. MgO: 3.1 mass %, $Fe_2O_3$: 0.04 mass %, $SO_3$: 0.5 mass %, SrO: 7.3 mass %, and Cl: 1.4 mass %.

Among glass raw materials shown in Tables 1 and 2, water-insoluble components are silica sand ($SiO_2$), aluminum oxide (alumina), magnesium hydroxide, dolomite, strontium carbonate, fluorite ($CaF_2$) and colcothar (iron oxide, $Fe_2O_3$).

In Tables 3 and 4, the content ratios [unit: vol %] of the respective water-insoluble components in the total of water-insoluble components in the glass raw material mixture are disclosed. Further, the results of the above (a), (b1) and (b2) obtained with respect to the water-insoluble components in each Example, are shown in Tables 3 and 4.

In Tables 1 and 2, the main production conditions in each Example are shown.

Examples 1 and 2

Preliminarily, an aqueous solution having 5.9 kg of magnesium chloride ($MgCl_2.6H_2O$, the same applies hereinafter) dissolved in 37.6 kg of water, was prepared.

Then, 494.1 kg of the rest of raw materials excluding magnesium chloride among the blend components shown in Table 1 was introduced into an Eirich mixer (tradename: RV15, manufactured by Nippon Eirich Co., Ltd., the same applies hereinafter) having a capacity of 750 L and mixed for 30 seconds at a pan rotational speed of 17 rpm and at a rotor rotational speed of 250 rpm.

Then, 43.5 kg of the above aqueous solution (solid content: 5.9 kg, water: 37.6 kg) was introduced, and the rotor rotational speed was raised to 860 rpm, whereupon granulation was carried out for 13 minutes in Example 1 and for 13.5 minutes in Example 2. The proportion of water (shown in Tables as amount of water added, the same applies hereinafter) in the total amount introduced (the total of 500 kg of glass raw materials and 37.6 kg of water) was about 7.0 mass %.

The obtained granules were taken out from the granulator and dried by means of a rotary kiln under conditions of a heating chamber temperature of 550° C. and a retention time of from 25 to 40 minutes to reduce the water content in the granules to be at most 2 mass %. The granules after drying were subjected to screening through a sieve of 1 mm, as the case required.

[Evaluation]

With respect to the granules after drying as described above, the measurements of the above (c) and (d) were carried out.

Figure 4:
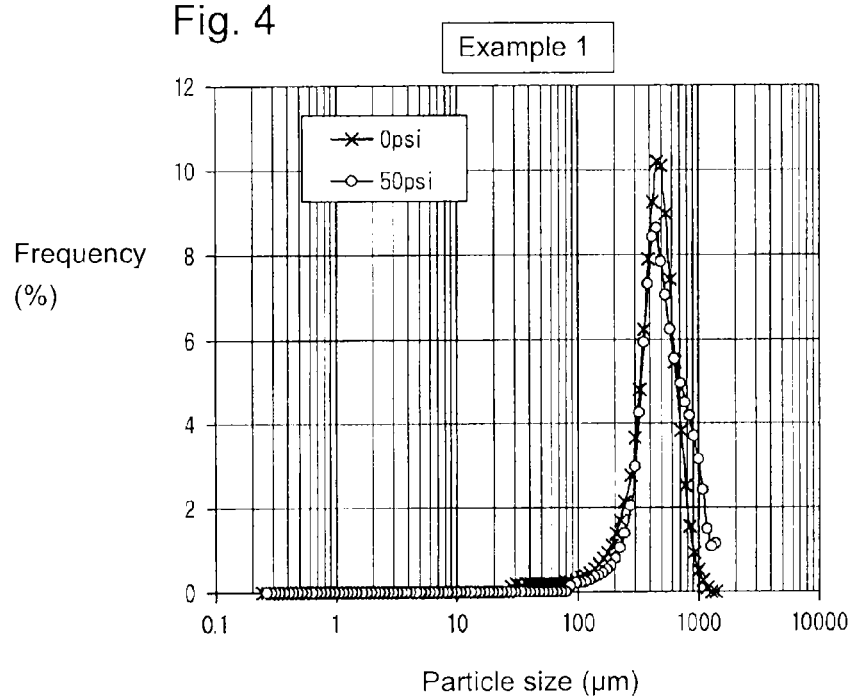
FIG. 4 is a graph showing particle size distribution curves of granules in an Example.
Figure 5:
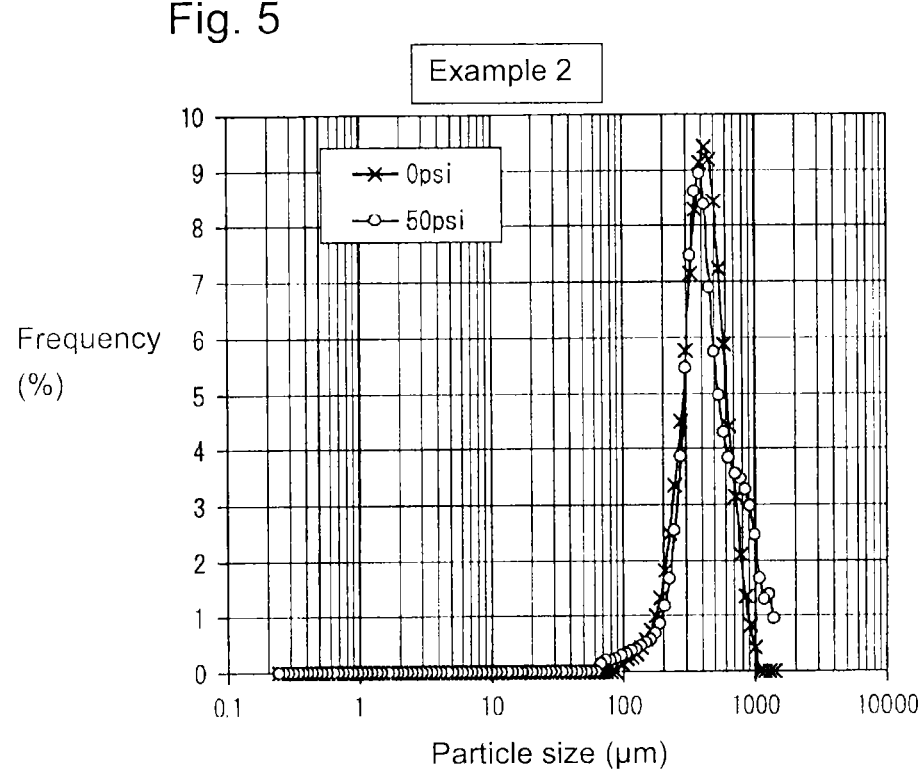
FIG. 5 is a graph showing particle size distribution curves of granules in an Example.

Further, in the foregoing, a part of granules in a wet state taken out from the granulator after the granulation, was sampled and dried in an oven at 120° C. for at least 3 hours to obtain a sample having the water content reduced to at most 2 mass %, and using the sample, the measurements of the above (e) to (g) were carried out. The results are shown in Table 3. The particle size distribution curves of the granules obtained by the measurements of (c) and (d) are shown in FIGS. 4 and 5.

Figure 15:
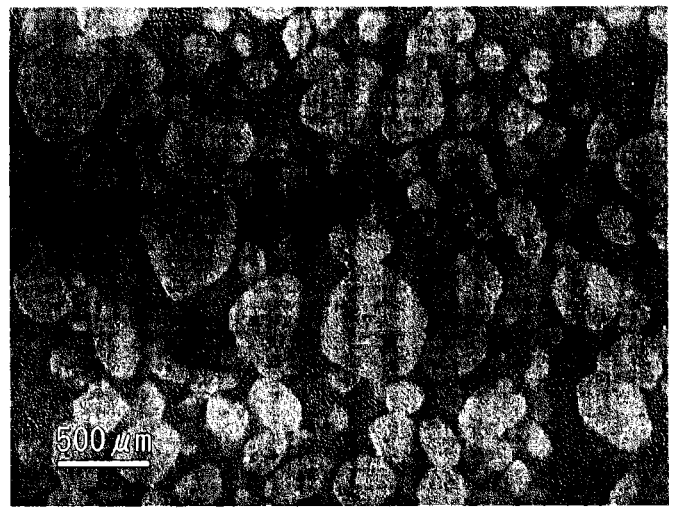
FIG. 15 is an optical microscopic photograph of granules in Example 1.
Figure 16:
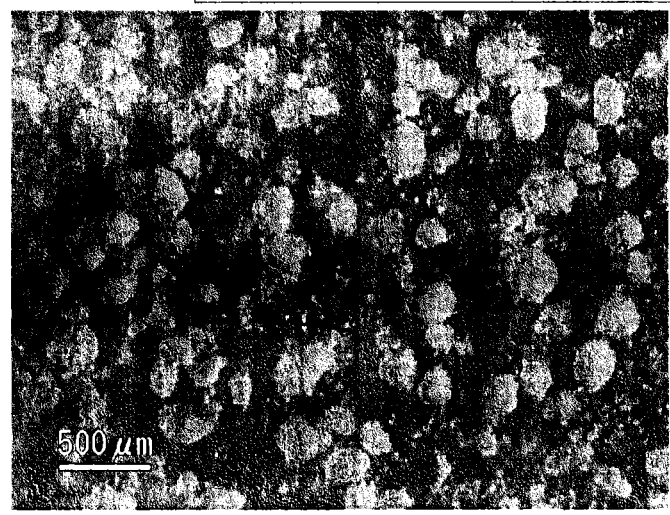
FIG. 16 is an optical microscopic photograph of particles having particle sizes of less than 250 µm in granules in Example 1.

FIGS. 15 and 16 are optical microscopic photographs of the granules obtained in Example 1. FIG. 15 is a photograph of the granules after drying at 120° C. for at least 3 hours and before screening through a sieve of 1 mm, and FIG. 16 is a photograph of fine powder in a range of less than 250 μm in diameter obtained by the screening.

Example 3

Preliminarily, an aqueous solution having 1.76 kg of magnesium chloride and 0.59 kg of magnesium sulfate ($MgSO_4.7H_2O$, the same applies hereinafter) dissolved in 3.48 kg of water, was prepared.

Then, 47.65 kg of the rest of raw materials excluding magnesium chloride and magnesium sulfate among the blend components shown in Table 1 was introduced into an Eirich mixer (tradename: R08, manufactured by Nippon Eirich Co., Ltd., the same applies hereinafter) having a capacity of 75 L and mixed for 30 seconds at a pan rotational speed of 24 rpm and at a rotor rotational speed of 500 rpm.

Then, 5.83 kg of the above aqueous solution (solid content: 2.35 kg, water: 3.48 kg) was introduced, and the rotor rotational speed was raised to 1,680 rpm, whereupon granulation was carried out for 10 minutes. The proportion of water (amount of water added) in the total amount introduced (the total of 50 kg of glass raw materials and 3.48 kg of water) was about 6.5 mass %.

The obtained granules were taken out from the granulator and dried in an amount of 400 g each time by means of a shelf dryer under conditions of 120° C. in air for 15 hours. The water content in the granules after drying was most 2 mass %. The granules after drying were subjected to screening through a sieve of 1 mm, as the case required.

Figure 6:
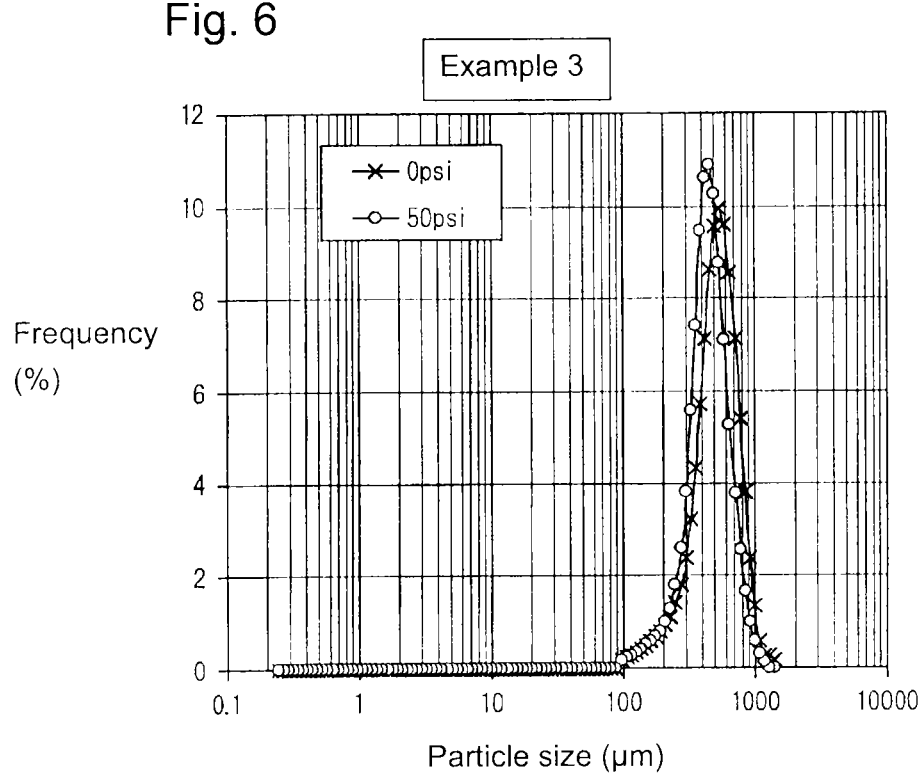
FIG. 6 is a graph showing particle size distribution curves of granules in an Example.

In the same manner as in Example 1, the measurements of the above (c) to (g) were carried out. The results are shown in Table 3. The particle size distribution curves of the granules obtained by the measurements of (c) and (d) are shown in FIG. 6.

Example 4

Preliminarily, an aqueous solution having 1.76 kg of magnesium chloride and 0.59 kg of magnesium sulfate dissolved in 3.76 kg of water, was prepared.

Then, 47.65 kg of the rest of raw materials excluding magnesium chloride and magnesium sulfate among the blend components shown in Table 1 was introduced into an Eirich mixer (tradename: R08) having a capacity of 75 L and mixed for 30 seconds at a pan rotational speed of 24 rpm and at a rotor rotational speed of 500 rpm.

Then, 6.11 kg of the above aqueous solution (solid content: 2.35 kg, water 3.76 kg) was introduced, and the rotor rotational speed was raised to 1,680 rpm, whereupon granulation was carried out for 7.5 minutes. The proportion of water (amount of water added) in the total amount introduced (the total of 50 kg of glass raw materials and 3.76 kg of water) was about 7.0 mass %.

The obtained granules were taken out from the granulator and dried in an amount of 400 g each time by means of a shelf dryer under conditions of 120° C. in air for 15 hours. The water content in the granules after drying was most 2 mass %. The granules after drying were subjected to screening through a sieve of 1 mm, as the case required.

Figure 7:
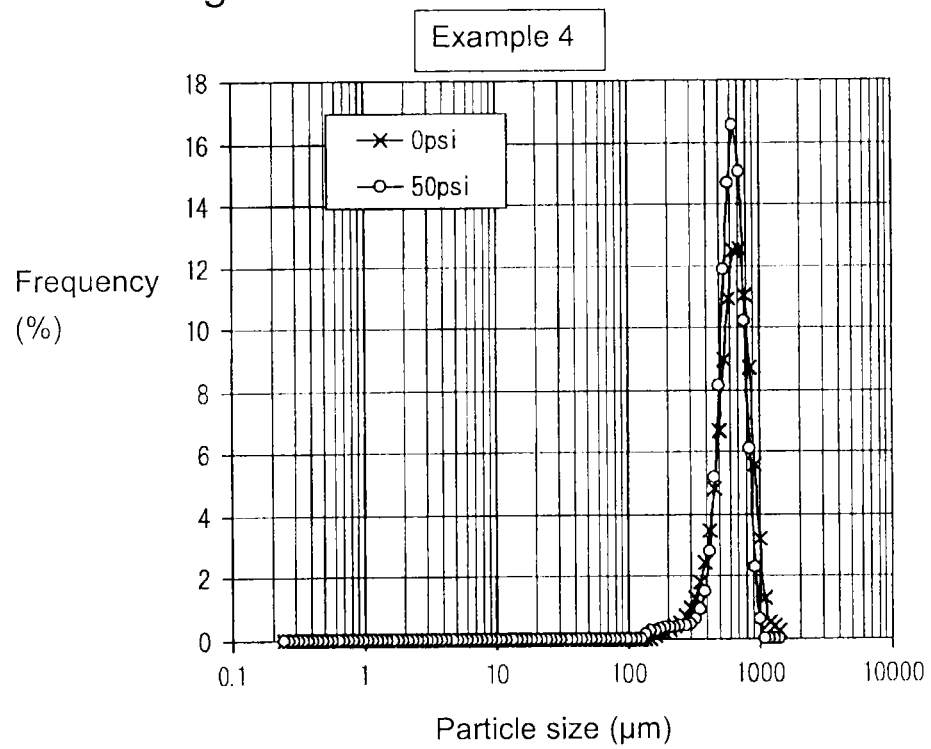
FIG. 7 is a graph showing particle size distribution curves of granules in an Example.

In the same manner as in Example 1, the measurements of the above (c) to (g) were carried out. The results are shown in Table 3. The particle size distribution curves of the granules obtained by the measurements of (c) and (d) are shown in FIG. 7.

FIG. 17 is an optical microscopic photograph before drying, of the granules obtained in Example 4.

Example 5

Preliminarily, an aqueous solution having 1.76 kg of magnesium chloride and 0.59 kg of magnesium sulfate dissolved in 5.56 kg of water, was prepared.

Then, 47.65 kg of the rest of raw materials excluding magnesium chloride and magnesium sulfate among the blend components shown in Table 1 was introduced into an Eirich mixer (tradename: R08) having a capacity of 75 L and mixed for 30 seconds at a pan rotational speed of 24 rpm and at a rotor rotational speed of 500 rpm.

Then, 7.91 kg of the above aqueous solution (solid content: 2.35 kg, water: 5.56 kg) was introduced, and the rotor rotational speed was raised to 1,680 rpm, whereupon granulation was carried out for 15 minutes. The proportion of water (amount of water added) in the total amount introduced (the total of 50 kg of glass raw materials and 5.56 kg of water) was about 10.0 mass %.

The obtained granules were taken out from the granulator and dried in an amount of 400 g each time by means of a shelf dryer under conditions of 120° C. in air for 15 hours. The water content in the granules after drying was most 2 mass %. The granules after drying were subjected to screening through a sieve of 1 mm, as the case required.

Figure 8:
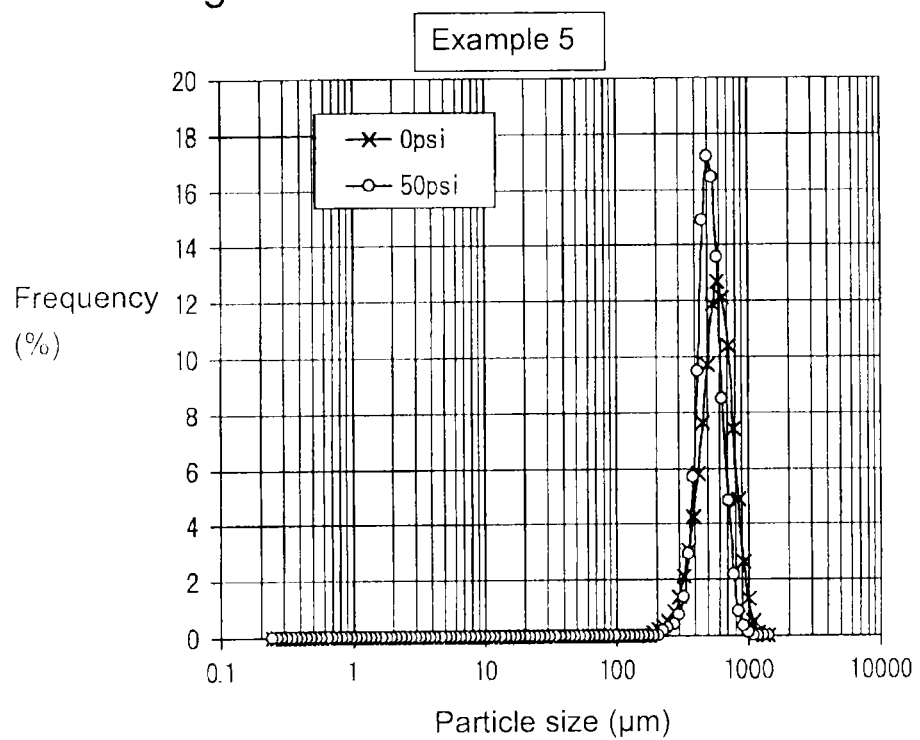
FIG. 8 is a graph showing particle size distribution curves of granules in an Example.

In the same manner as in Example 1, the measurements of the above (c) to (g) were carried out. The results are shown in Table 3. The particle size distribution curves of the granules obtained by the measurements of (c) and (d) are shown in FIG. 8.

FIG. 18 is an optical microscopic photograph before drying, of the granules obtained in Example 5.

Comparative Example 1

Preliminarily, an aqueous solution having 17.62 kg of magnesium chloride and 5.94 kg of magnesium sulfate dissolved in 68.2 kg of water, was prepared.

Then, 476.4 kg of the rest of raw materials excluding magnesium chloride and magnesium sulfate among the blend components shown in Table 2 was introduced into an Eirich mixer (tradename: RV15) having a capacity of 750 L and mixed for 30 seconds 1 at a pan rotational speed of 17 rpm and at a rotor rotational speed of 250 rpm.

Then, 91.8 kg of the above aqueous solution (solid content: 23.6 kg, water: 68.2 kg) was introduced, and the rotor rotational speed was raised to 860 rpm, whereupon granulation was carried out for 15 minutes, and thereafter, the rotor rotational speed was lowered to 230 rpm and particle size regulation (step for mainly taking fine powder into granules as nuclei) was carried out for 2.7 minutes. The proportion of water (amount of water added) in the total amount introduced (the total of 500 kg of glass raw materials and 68.2 kg of water) was about 12.0 mass %.

The obtained granules were taken out from the granulator and dried by means of a rotary kiln under conditions of a heating chamber temperature of 470° C. and a retention time of from 30 to 40 minutes to reduce the water content in the granules to be at most 2 mass %. The granules after drying were subjected to screening through a sieve of 1 mm, as the case required.

Figure 9:
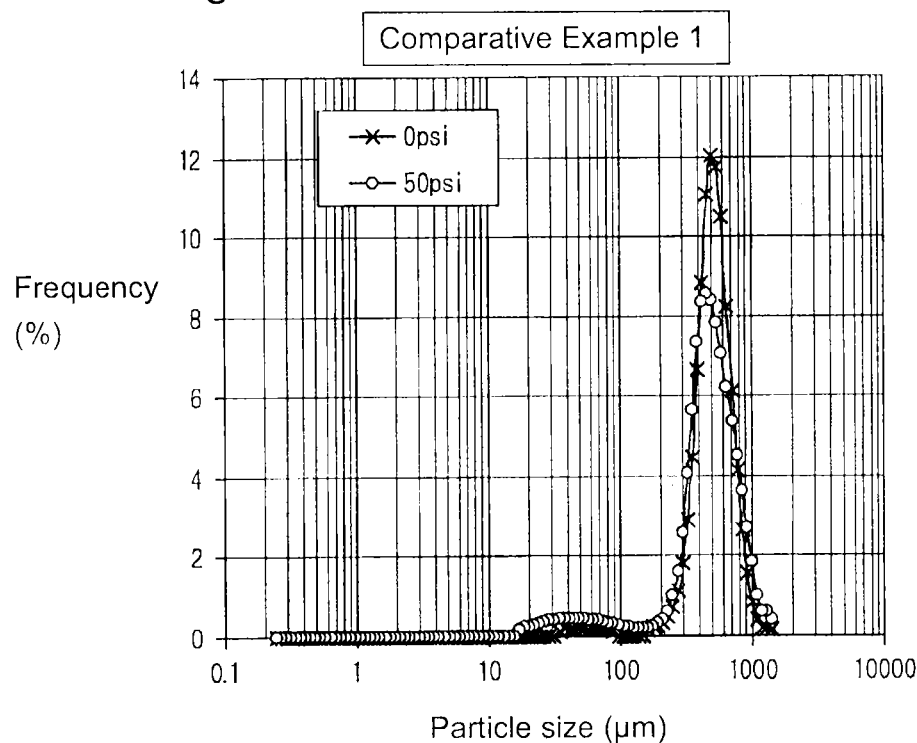
FIG. 9 is a graph showing particle size distribution curves of granules in a Comparative Example.

In the same manner as in Example 1, the measurements of the above (c) to (g) were carried out. The results are shown in Table 4. The particle size distribution curves of the granules obtained by the measurements of (c) and (d) are shown in FIG. 9.

FIGS. 19 to 22 are optical microscopic photographs of the granules obtained in Comparative Example 1. FIG. 19 is a photograph before drying, FIG. 20 is a photograph of the granules after the drying and before screening through a sieve of 1 mm, FIG. 21 is a photograph of particles in a range of at least 500 μm and less than 1,000 μm in diameter obtained by the screening, and FIG. 22 is a photograph of fine powder in a range of less than 250 μm in diameter.

Comparative Examples 2 and 3

In Comparative Example 2, granules having a water content of at most 2 mass % were obtained in the same manner as in Comparative Example 1 except that in Comparative Example 1, the drying temperature condition was changed to 600° C.

In Comparative Example 3, granules having a water content of at most 2 mass % were obtained in the same manner as in Comparative Example 1 except that in Comparative Example 1, the drying temperature condition was changed to 550° C.

Figure 10:
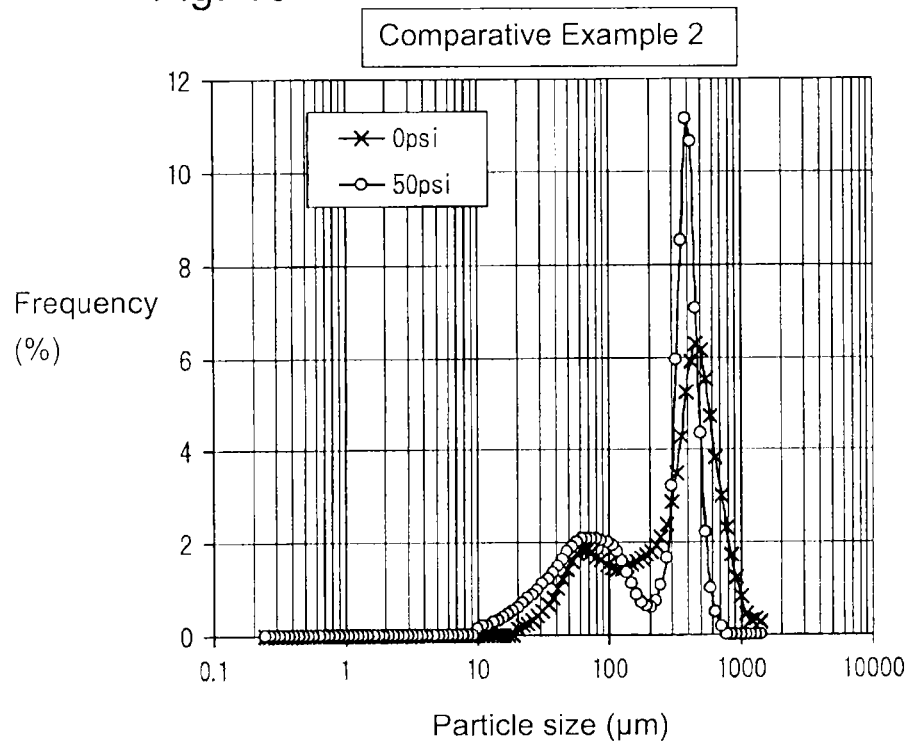
FIG. 10 is a graph showing particle size distribution curves of granules in a Comparative Example.
Figure 11:
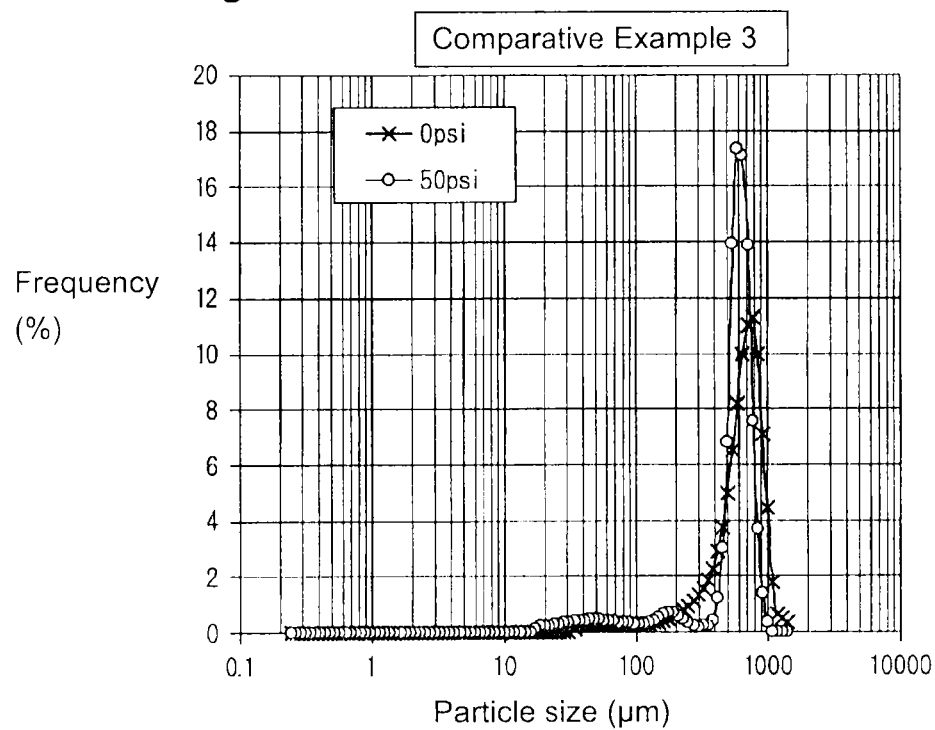
FIG. 11 is a graph showing particle size distribution curves of granules in a Comparative Example.

In each Example, the granules after drying were subjected to screening through a sieve of 1 mm, as the case required. In the same manner as in Example 1, the measurements of the above (c) to (g) were carried out. The results are shown in Table 4. The particle size distribution curves of the granules obtained by the measurements of (c) and (d) are shown in FIGS. 10 and 11.

Comparative Example 4

Preliminarily, an aqueous solution having 1.76 kg of magnesium chloride and 0.59 kg of magnesium sulfate dissolved in 4.95 kg of water, was prepared.

Then, 47.65 kg of the rest of raw materials excluding magnesium chloride and magnesium sulfate among the blend components shown in Table 2 was introduced into an Eirich mixer (tradename: R08) having a capacity of 75 L and mixed for 30 seconds at a pan rotational speed of 24 rpm and at a rotor rotational speed of 500 rpm.

Then, 7.3 kg of the above aqueous solution (solid content: 2.35 kg, water: 4.95 kg) was introduced, and the rotor rotational speed was raised to 1,680 rpm, whereupon granulation was carried out for 12.5 minutes. The proportion of water (amount of water added) in the total amount introduced (the total of 50 kg of glass raw materials and 4.95 kg of water) was about 9.0 mass %.

The obtained granules were taken out from the granulator and dried in an amount of 400 g each time by means of a shelf dryer under conditions of 120° C. in air for 15 hours. The water content in the granules after drying was most 2 mass %. The granules after drying were subjected to screening through a sieve of 1 mm, as the case required.

Figure 12:
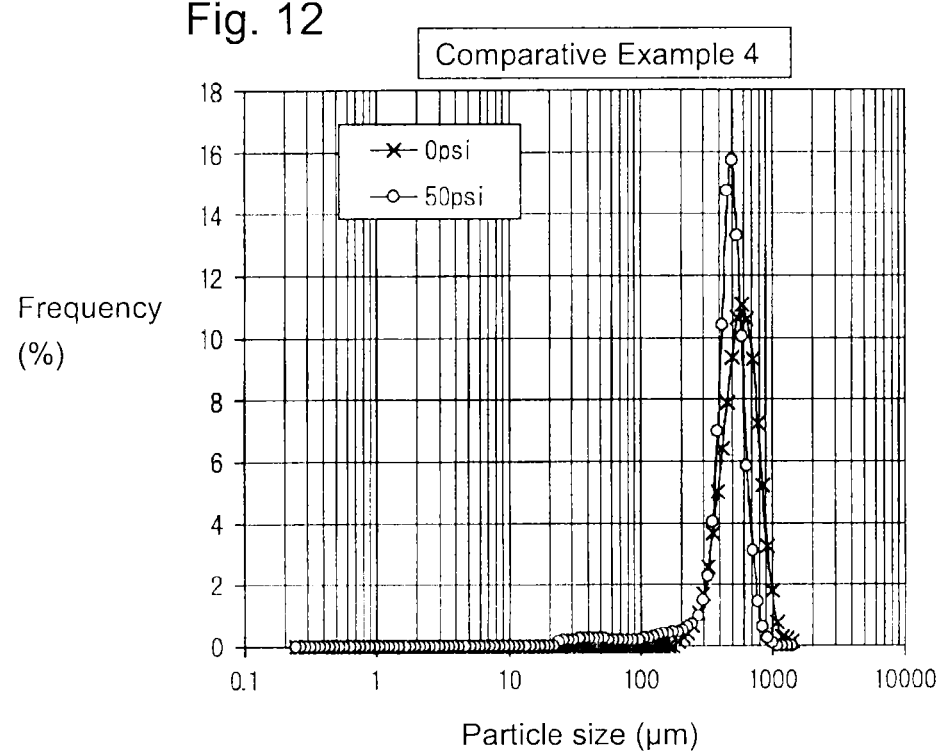
FIG. 12 is a graph showing particle size distribution curves of granules in a Comparative Example.

In the same manner as in Example 1, the measurements of the above (c) to (g) were carried out. The results are shown in Table 4. The particle size distribution curves of the granules obtained by the measurements of (c) and (d) are shown in FIG. 12.

Figure 23:
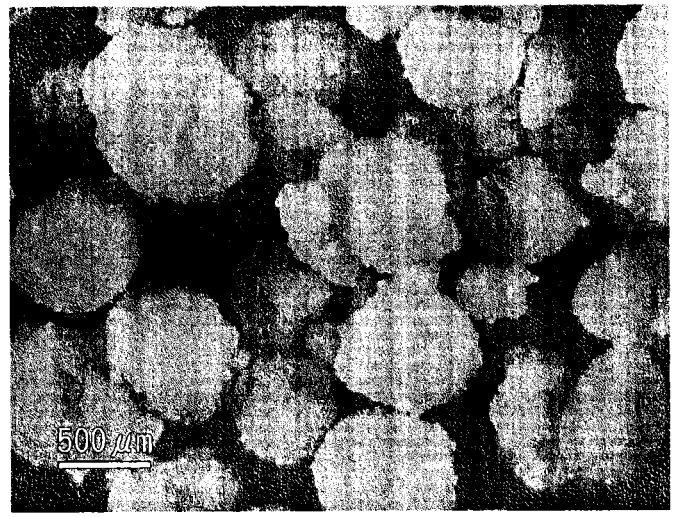
FIG. 23 is an optical microscopic photograph of granules in Comparative Example 4.

FIG. 23 is an optical microscopic photograph before drying, of the granules obtained in Comparative Example 4.

Comparative Example 5

Preliminarily, an aqueous solution having 1.76 kg of magnesium chloride and 0.59 kg of magnesium sulfate dissolved in 5.56 kg of water, was prepared.

Then, 47.65 kg of the rest of raw materials excluding magnesium chloride and magnesium sulfate among the blend components shown in Table 2 was introduced into an Eirich mixer (tradename: R08) having a capacity of 75 L and mixed for 30 seconds at a pan rotational speed of 24 rpm and at a rotor rotational speed of 500 rpm.

Then, 7.91 kg of the above aqueous solution (solid content: 2.35 kg, water: 5.56 kg) was introduced, and the rotor rotational speed was raised to 1,680 rpm, whereupon granulation was carried out for 20 minutes, and thereafter, the rotor rotational speed was lowered to 500 rpm, and particle size regulation (step for mainly taking fine powder into granules as nuclei) was carried out for 1 minute. The proportion of water (amount of water added) in the total amount introduced (the total of 50 kg of glass raw materials and 5.56 kg of water) was about 10.0 mass %.

The obtained granules were taken out from the granulator and dried in an amount of 400 g each time by means of a shelf dryer under conditions of 120° C. in air for 15 hours. The water content in the granules after drying was most 2 mass %. The granules after drying were subjected to screening through a sieve of 1 mm, as the case required.

Figure 13:
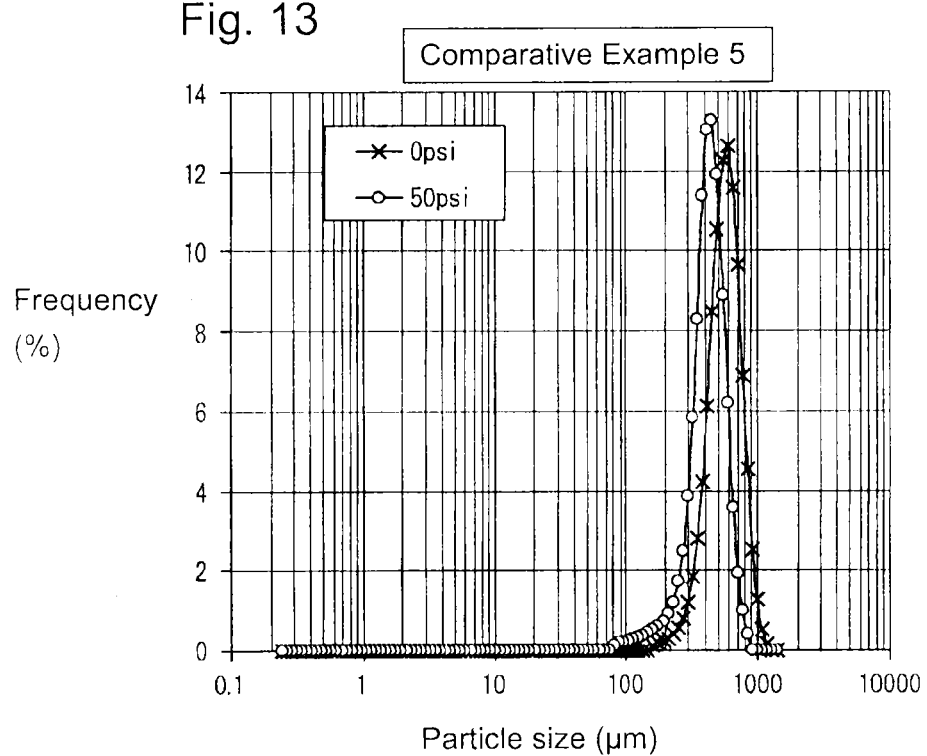
FIG. 13 is a graph showing particle size distribution curves of granules in a Comparative Example.

In the same manner as in Example 1, the measurements of the above (c) to (g) were carried out. The results are shown in Table 4. The particle size distribution curves of the granules obtained by the measurements of (c) and (d) are shown in FIG. 13.

Figure 24:
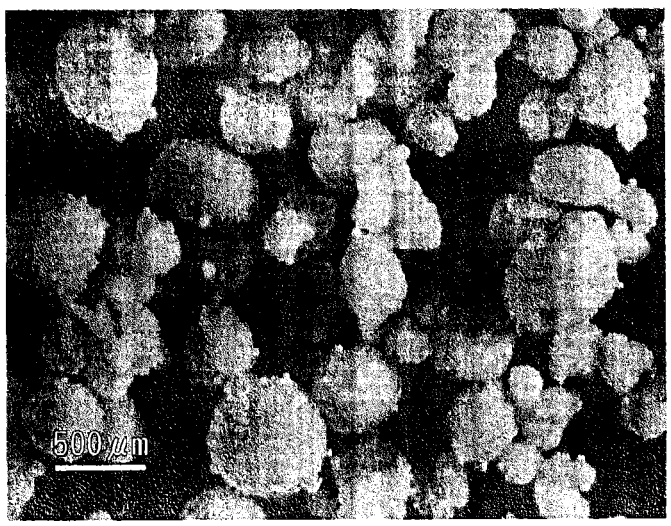
FIG. 24 is an optical microscopic photograph of granules in Comparative Example 5.

FIG. 24 is an optical microscopic photograph before drying, of the granules obtained in Comparative Example 5.

Comparative Example 6

In Comparative Example 6, granules having a water content of at most 2 mass % were obtained in the same manner as in Comparative Example 5 except that in Comparative Example 5, the granulation time was changed from 20 minutes to 13.5 minutes and no particle size regulation was carried out. The granules after drying were subjected to screening through a sieve of 1 mm, as the case required.

Figure 14:
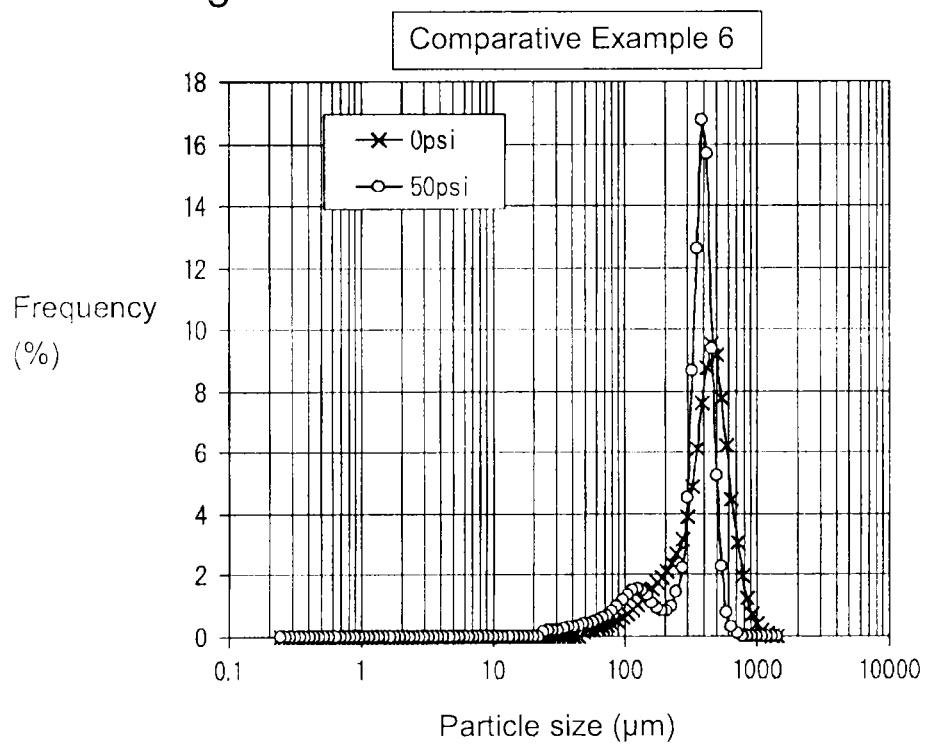
FIG. 14 is a graph showing particle size distribution curves of granules in a Comparative Example.

In the same manner as in Example 1, the measurements of the above (c) to (g) were carried out. The results are shown in Table 4. The particle size distribution curves of the granules obtained by the measurements of (c) and (d) are shown in FIG. 14.

(h) Crushing Strength of Granules

Figure 25:
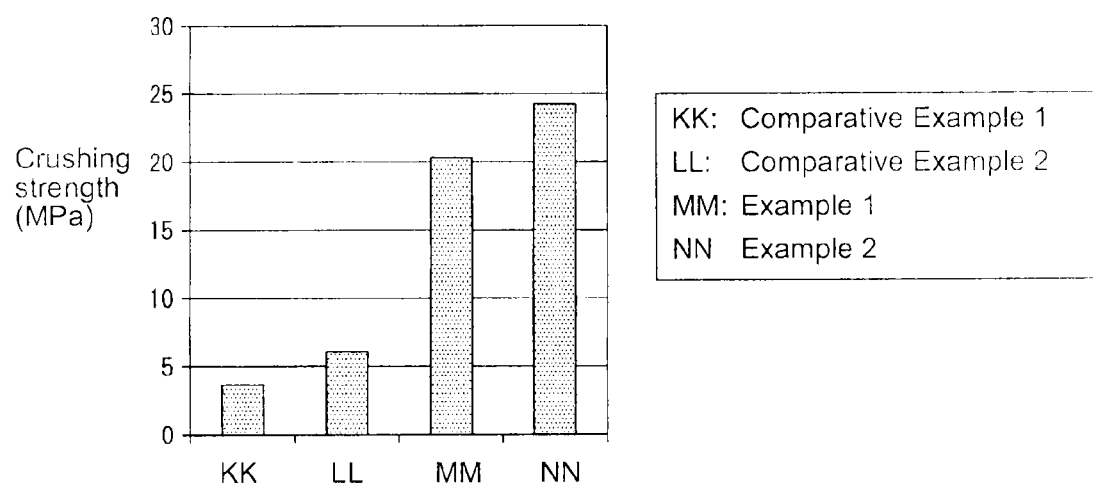
FIG. 25 is a graph showing crushing strengths of granules in Examples and Comparative Examples.

In each of Examples 1 and 2 and Comparative Examples 1 and 2, with respect to from 50 to 100 particles optionally selected from the granules after drying in the rotary kiln and before screening through the sieve of 1 mm, the crushing strength (unit: MPa) was measured by a method in accordance with JIS R 1639-5, and the average value was obtained. As the measuring apparatus, a particulate hardness measuring device (Better Hardness Tester BHT500, manufactured by Seishin Enterprise Co., Ltd.) was used. The results are shown in Tables 3 and 4 and in FIG. 25.

TABLE 1

| | | D50 of raw material [μm] | D90 of raw material [μm] | Density of raw material [g/cm³] | Ex. 1 | Ex. 2 | Ex. 3 | Ex. 4 | Ex. 5 |
|---|---|---|---|---|---|---|---|---|---|
| Silica sand | $SiO_2$ | 25.0 | 39.2 | 2.2 | 49.044 | 49.044 | 49.044 | 49.044 | 48.909 |
| Aluminum source | $Al_2O_3$-1 | 4.0 | 7.2 | 3.9 | | | | | 14.090 |
| | $Al_2O_3$-2 | 4.2 | 7.5 | 3.9 | 14.162 | 14.162 | 14.162 | 14.162 | |
| | $Al_2O_3$-3 | 52.0 | 86.1 | 3.9 | | | | | |
| Boron source | $H_3BO_3$ | 324.0 | 454.0 | 1.4 | 13.987 | 13.987 | 13.987 | 13.987 | 13.912 |
| Magnesium source | $Mg(OH)_2$ | 6.7 | 11.8 | 2.4 | 1.355 | 1.355 | 1.355 | 1.355 | 0.233 |
| | $MgCl_2 \cdot 6H_2O$ (clarifying agent) | About 3000 | | | 3.523 | 3.523 | 3.524 | 3.524 | 3.510 |
| | $MgSO_4 \cdot 7H_2O$ (clarifying agent) | About 300 | | | 1.187 | 1.187 | 1.187 | 1.187 | 1.181 |
| Magnesium source and alkaline earth metal source | Dolomite-1 | 14.4 | 30.7 | 2.9 | 7.302 | 7.302 | 7.302 | 7.302 | |
| | Dolomite-2 | 27.7 | 78.7 | 2.9 | | | | | 8.780 |
| Alkaline earth metal source | $SrCO_3$ | 6.3 | 10.9 | 3.7 | 9.075 | 9.075 | 9.075 | 9.075 | 9.026 |
| | $CaF_2$ (Fluorite) | 19.6 | 47.8 | 3.2 | 0.352 | 0.352 | 0.352 | 0.352 | 0.350 |
| Iron source | $Fe_2O_3$ | 39.0 | 116.0 | 5.2 | 0.012 | 0.012 | 0.012 | 0.012 | 0.011 |
| Total of all raw materials [mass %] | | | | | 100.0 | 100.0 | 100.0 | 100.0 | 100.0 |
| Size of granulator (Eirich Intensive mixer) [L] | | | | | 750 | 750 | 75 | 75 | 75 |
| Amount of glass raw material powder introduced into granulator [kg] | | | | | 500.0 | 500.0 | 50.0 | 50.0 | 50.0 |
| Amount of water added [mass %] | | | | | 7.0 | 7.0 | 6.5 | 7.0 | 10.0 |
| Granulation time [min] | | | | | 13.0 | 13.5 | 10.0 | 7.5 | 15.0 |
| Particle size regulation time [min] | | | | | 0.0 | 0.0 | 0.0 | 0.0 | 0.0 |
| Dryer | | | | | Rotary kiln | Rotary kiln | Shelf dryer | Shelf dryer | Shelf dryer |
| Drying temperature [° C.] | | | | | 550 | 550 | 120 | 120 | 120 |

TABLE 2

| | | D50 of raw material [μm] | D90 of raw material [μm] | Density of raw material [g/cm³] | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|
| Silica sand | $SiO_2$ | 25.0 | 39.2 | 2.2 | 48.909 | 48.909 | 48.909 | 49.041 | 48.909 | 48.909 |
| Aluminum source | $Al_2O_3$-1 | 4.0 | 7.2 | 3.9 | | | | | | |
| | $Al_2O_3$-2 | 4.2 | 7.5 | 3.9 | | | | | | |
| | $Al_2O_3$-3 | 52.0 | 86.1 | 3.9 | 14.090 | 14.090 | 14.090 | 14.165 | 14.090 | 14.090 |
| Boron source | $H_3BO_3$ | 324.0 | 454.0 | 1.4 | 13.912 | 13.912 | 13.912 | 13.987 | 13.912 | 13.912 |
| Magnesium source | $Mg(OH)_2$ | 6.7 | 11.8 | 2.4 | 0.233 | 0.233 | 0.233 | 1.355 | 0.233 | 0.233 |
| | $MgCl_2 \cdot 6H_2O$ (clarifying agent) | About 3000 | | | 3.510 | 3.510 | 3.510 | 3.524 | 3.510 | 3.510 |
| | $MgSO_4 \cdot 7H_2O$ (clarifying agent) | About 300 | | | 1.181 | 1.181 | 1.181 | 1.187 | 1.181 | 1.181 |
| Magnesium source and alkaline earth metal source | Dolomite-1 | 14.4 | 30.7 | 2.9 | | | | 7.302 | | |
| | Dolomite-2 | 27.7 | 78.7 | 2.9 | 8.780 | 8.780 | 8.780 | | 8.780 | 8.780 |
| Alkaline earth metal source | $SrCO_3$ | 6.3 | 10.9 | 3.7 | 9.026 | 9.026 | 9.026 | 9.075 | 9.026 | 9.026 |
| | $CaF_2$ (Fluorite) | 19.6 | 47.8 | 3.2 | 0.350 | 0.350 | 0.350 | 0.352 | 0.350 | 0.350 |
| Iron source | $Fe_2O_3$ | 39.0 | 116.0 | 5.2 | 0.011 | 0.011 | 0.011 | 0.012 | 0.011 | 0.011 |
| Total of all raw materials [mass %] | | | | | 100.0 | 100.0 | 100.0 | 100.0 | 100.0 | 100.0 |
| Size of granulator (Eirich Intensive mixer) [L] | | | | | 750 | 750 | 750 | 75 | 75 | 75 |
| Amount of glass raw material powder introduced into granulator [kg] | | | | | 500.0 | 500.0 | 500.0 | 50.0 | 50 | 50 |
| Amount of water added [mass %] | | | | | 12.0 | 12.0 | 12.0 | 9.0 | 10 | 10 |
| Granulation time [min] | | | | | 15.0 | 15.0 | 15.0 | 12.5 | 20 | 13.5 |
| Particle size regulation time [min] | | | | | 2.7 | 2.7 | 2.7 | 0.0 | 1 | 0 |
| Dryer | | | | | Rotary kiln | Rotary kiln | Rotary kiln | Shelf dryer | Shelf dryer | Shelf dryer |
| Drying temperature [° C.] | | | | | 470 | 600 | 550 | 120 | 120 | 120 |

TABLE 3

| | | | D50 of raw material [μm] | D90 of raw material [μm] | Density of raw material [g/cm³] | Ex. 1 | Ex. 2 | Ex. 3 | Ex. 4 | Ex. 5 |
|---|---|---|---|---|---|---|---|---|---|---|
| Water-insoluble components [vol %] | Silica sand | SiO₂ | 25.0 | 39.2 | 2.2 | 70.49 | 70.49 | 70.49 | 70.49 | 70.41 |
| | Aluminum source | Al₂O₃-1 | 4.0 | 7.2 | 3.9 | | | | | 11.44 |
| | | Al₂O₃-2 | 4.2 | 7.5 | 3.9 | 11.48 | 11.48 | 11.48 | 11.48 | |
| | | Al₂O₃-3 | 52.0 | 86.1 | 3.9 | | | | | |
| | Magnesium source | Mg(OH)₂ | 6.7 | 11.8 | 2.4 | 1.82 | 1.82 | 1.82 | 1.82 | 0.31 |
| | Magnesium source and alkaline earth metal source | Dolomite-1 | 14.4 | 30.7 | 2.9 | 8.10 | 8.10 | 8.10 | 8.10 | |
| | | Dolomite-2 | 27.7 | 78.7 | 2.9 | | | | | 9.76 |
| | Alkaline earth metal source | SrCO₃ | 6.3 | 10.9 | 3.7 | 7.76 | 7.76 | 7.76 | 7.76 | 7.73 |
| | | CaF₂ (Fluorite) | 19.6 | 47.8 | 3.2 | 0.35 | 0.35 | 0.35 | 0.35 | 0.35 |
| | Iron source | Fe₂O₃ | 39.0 | 116.0 | 5.2 | 0.01 | 0.01 | 0.01 | 0.01 | 0.01 |
| Total of water-insoluble components [vol %] | | | | | | 100.0 | 100.0 | 100.0 | 100.0 | 100.0 |
| (a) Proportion of particles exceeding 50 μm in diameter of water-insoluble components [vol %] | | | | | | 1.71 | 1.71 | 1.71 | 1.71 | 3.99 |
| (b1) D50 of water-insoluble components [μm] | | | | | | 24.4 | 24.4 | 24.4 | 24.4 | 22.2 |
| (b2) D90 of water-insoluble components [μm] | | | | | | 37.1 | 37.1 | 37.1 | 37.1 | 39.9 |
| (c) D50 of granules [μm] | | | | | | 425.0 | 393.0 | 496.1 | 618.2 | 551.0 |
| (d) Fine powder rate at the time of compression air spraying of granules [vol %] | | | | | | 0.0 | 0.0 | 0.0 | 0.0 | 0.0 |
| (e) Filling rate of granules [%] | | | | | | 79.1 | 80.2 | 83.6 | 82.4 | 77.4 |
| (f) Bulk density of granules [g/ml] | | | | | | 1.16 | 1.14 | 1.15 | 1.17 | 1.14 |
| (g1) Proportion of fine powder of less than 106 μm in granules [mass %] | | | | | | 0.04 | 0.02 | 0.20 | 0.48 | 0.23 |
| (g2) Proportion of fine powder of less than 250 μm in granules [mass %] | | | | | | 24.64 | 16.43 | 7.5 | 9.16 | 5.32 |
| (h) Crushing strength of granules [MPa] | | | | | | 20.28 | 24.24 | | | |
| Particle size distribution curves of granules | | | | | | FIG. 4 | FIG. 5 | FIG. 6 | FIG. 7 | FIG. 8 |
| Photographs of granules | | | | | | FIGS. 15, 16 | | | FIG. 17 | FIG. 18 |

TABLE 4

| | | | D50 of raw material [μm] | D90 of raw material [μm] | Density of raw material [g/cm³] | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|---|---|---|---|
| Water-insoluble components [vol %] | Silica sand | SiO₂ | 25.0 | 39.2 | 2.2 | 70.41 | 70.41 | 70.41 | 70.49 | 70.41 | 70.41 |
| | Aluminum source | Al₂O₃-1 | 4.0 | 7.2 | 3.9 | | | | | | |
| | | Al₂O₃-2 | 4.2 | 7.5 | 3.9 | | | | | | |
| | | Al₂O₃-3 | 52.0 | 86.1 | 3.9 | 11.44 | 11.44 | 11.44 | 11.48 | 11.44 | 11.44 |
| | Magnesium source | Mg(OH)₂ | 6.7 | 11.8 | 2.4 | 0.31 | 0.31 | 0.31 | 1.82 | 0.31 | 0.31 |
| | Magnesium source and alkaline earth metal source | Dolomite-1 | 14.4 | 30.7 | 2.9 | | | | 8.10 | | |
| | | Dolomite-2 | 27.7 | 78.7 | 2.9 | 9.76 | 9.76 | 9.76 | | 9.76 | 9.76 |
| | Alkaline earth metal source | SrCO₃ | 6.3 | 10.9 | 3.7 | 7.73 | 7.73 | 7.73 | 7.76 | 7.73 | 7.73 |
| | | CaF₂ (Fluorite) | 19.6 | 47.8 | 3.2 | 0.35 | 0.35 | 0.35 | 0.35 | 0.35 | 0.35 |
| | Iron source | Fe₂O₃ | 39.0 | 116.0 | 5.2 | 0.01 | 0.01 | 0.01 | 0.01 | 0.01 | 0.01 |
| Total of water-insoluble components [vol %] | | | | | | 100.0 | 100.0 | 100.0 | 100.0 | 100.0 | 100.0 |
| (a) Proportion of particles exceeding 50 μm in diameter of water-insoluble components [vol %] | | | | | | 9.83 | 9.83 | 9.83 | 7.57 | 9.83 | 9.83 |
| (b1) D50 of water-insoluble components [μm] | | | | | | 25.1 | 25.1 | 25.1 | 24.1 | 25.1 | 25.1 |
| (b2) D90 of water-insoluble components [μm] | | | | | | 51.2 | 51.2 | 51.2 | 46.6 | 51.2 | 51.2 |
| (c) D50 of granules [μm] | | | | | | 486.6 | 341.0 | 630.0 | 543.0 | 542.0 | 399.0 |
| (d) Fine powder rate at the time of compression air spraying of granules [vol %] | | | | | | 5.0 | 15.0 | 4.2 | 2.1 | 0 | 2.4 |
| (e) Filling rate of granules [%] | | | | | | 68.3 | 71.7 | 70.6 | 77.8 | 77.3 | 78.3 |
| (f) Bulk density of granules [g/ml] | | | | | | 1.02 | 1.14 | 1.07 | 1.08 | 1.12 | 1.10 |
| (g1) Proportion of fine powder of less than 106 μm in granules [mass %] | | | | | | 5.14 | 38.37 | 17.77 | 2.63 | 2.78 | 2.36 |
| (g2) Proportion of fine powder of less than 250 μm in granules [mass %] | | | | | | 8.03 | 55.46 | 23.50 | 9.10 | 13.78 | 16.90 |
| (h) Crushing strength of granules [MPa] | | | | | | 3.66 | 6.08 | | | | |
| Particle size distribution curves of granules | | | | | | FIG. 9 | FIG. 10 | FIG. 11 | FIG. 12 | FIG. 13 | FIG. 14 |
| Photographs of granules | | | | | | FIGS. 19 to 22 | | | FIG. 23 | FIG. 24 | |

As the results in Tables 3 and 4 show, in the granules obtained in Examples 1 to 5 which satisfied (a) being at most 6 mass % and (b2) being at most 45 μm, the content of fine powder in a range of less than 250 μm in diameter was small, and particularly the content of fine powder of less than 106 μm in diameter was small. That is, formation of fine powder during the production was well prevented.

Especially when Examples 1 to 4 and Comparative Example 4, or Example 5 and Comparative Examples 1 to 3, 5 and 6, are compared, it is evident that by using aluminum oxide having a small particle size, it is possible to reduce formation of fine powder during the production.

In Examples wherein aluminum oxide having a small particle size is used, formation of fine powder during the production is less than in Comparative Examples and it is therefore considered that aluminum oxide having a small particle size is more readily taken into granules as nuclei than aluminum oxide having a large particle size. Here, the reason is considered to be such that when aluminum oxide has a large particle size, the centrifugal force during the granulation outweighs the liquid bridge force, whereby it tends to be hardly taken into granules as nuclei.

With the granules in Examples 1 to 5, the filling rate is high, and the bulk density is also high. Further, with the granules in Examples 1 to 5, the fine powder rate after compressed-air spraying is zero, and with the granules in Examples 1 and 2, the crushing strength is high. That is, the granules obtained in Examples 1 to 5 are dense and have high strength.

When photographs of granules before drying are compared, on the granules in Comparative Example 1 (FIG. 19), Comparative Example 4 (FIG. 23) and Comparative Example 5 (FIG. 24), fine primary particles are observed as attached around them, while on the granules in Example 4 (FIG. 17) and Example 5 (FIG. 18), no attachment of such fine primary particles is observed.

When the photograph (FIG. 19) before drying and the photograph (FIG. 20) after drying in Comparative Example 1 are compared, it is evident that the fine primary particles attached around granules peel off during the drying step and cause fine powder.

Further, when attention is drawn to a fine powder range of less than 250 μm in diameter, of granules after drying, in the fine powder range (FIG. 22) in Comparative Example 1, many fine primary particles are observed, while in the fine powder range (FIG. 16) in Example 1, many granules of relatively small sizes are observed and fine primary particles are little.

Thus, fine primary particles attached around granules are considered to be particles which were not well taken into granules as nuclei having glass raw material particles agglomerated.

(i) Variation in Composition Due to Difference in Particle Size of Granules

In Examples 4 and 5 and Comparative Examples 4 and 5, with respect to granules passed through a sieve having 1 mm openings after drying, sieving was carried out to particle size ranges of less than 250 μm, at least 250 μm to less than 500 μm, and at least 500 μm to less than 1,000 μm, and with respect to each particle size range, the component composition was measured by a fluorescent X-ray method. The results are shown in Table 5.

From the results in Table 5, it is evident that in each Example, the particle size range of less than 250 μm has a large deviation from the desired composition, as compared with other particle size ranges.

As shown in "(g2) Proportion of fine powder of less than 250 μm in diameter in granules" in Tables 3 and 4, in Examples of the present invention, the proportion of fine powder of less than 250 μm in diameter is reduced as compared with in Comparative Examples, whereby variation in composition in the entire granules is reduced.

Further, as the results in Table 5 show, in Example 4 wherein ones having small D50 were used particularly as aluminum oxide and dolomite, deviation of the composition of particles of less than 250 in diameter from the desired composition is little.

TABLE 5

| | | Desired composition | Example 4 | | | Example 5 | | | Comparative Example 4 | | | Comparative Example 5 | | |
|---|---|---|---|---|---|---|---|---|---|---|---|---|---|---|
| | Components | | <250 μm | 250 to 500 μm | 500 to 1000 μm | <250 μm | 250 to 500 μm | 500 to 1000 μm | <250 μm | 250 to 500 μm | 500 to 1000 μm | <250 μm | 250 to 500 μm | 500 to 1000 μm |
| Component composition (mass %) | $SiO_2$ | 57.7 | 63.44 | 57.68 | 57.59 | 59.10 | 58.25 | 58.23 | 49.84 | 58.57 | 58.69 | 52.26 | 58.55 | 59.35 |
| | $Al_2O_3$ | 16.8 | 13.41 | 16.42 | 17.19 | 7.93 | 16.40 | 16.55 | 33.35 | 16.32 | 14.45 | 20.30 | 16.19 | 15.72 |
| | $B_2O_3$ | 9.3 | 8.61 | 9.66 | 8.85 | 4.79 | 9.39 | 9.31 | 6.46 | 9.51 | 9.66 | 8.29 | 9.40 | 9.42 |
| | CaO | 3.9 | 3.87 | 3.76 | 3.81 | 14.76 | 3.76 | 3.71 | 2.87 | 3.66 | 3.95 | 6.73 | 3.64 | 3.28 |
| | MgO | 3.1 | 2.90 | 3.24 | 3.14 | 8.77 | 3.10 | 3.06 | 2.12 | 3.12 | 3.32 | 4.65 | 3.06 | 2.83 |
| | $Fe_2O_3$ | 0.04 | 0.05 | 0.03 | 0.04 | 0.16 | 0.06 | 0.05 | 0.08 | 0.03 | 0.04 | 0.08 | 0.05 | 0.05 |
| | $SO_3$ | 0.5 | 0.40 | 0.53 | 0.41 | 0.23 | 0.46 | 0.35 | 0.35 | 0.54 | 0.49 | 0.36 | 0.46 | 0.45 |
| | SrO | 7.3 | 6.01 | 7.28 | 7.63 | 3.53 | 7.24 | 7.33 | 3.96 | 6.79 | 7.95 | 6.06 | 7.14 | 7.43 |
| | Cl | 1.4 | 1.30 | 1.40 | 1.34 | 0.73 | 1.34 | 1.41 | 0.96 | 1.46 | 1.45 | 1.26 | 1.50 | 1.48 |
| | Total | 100.0 | 100.0 | 100.0 | 100.0 | 100.0 | 100.0 | 100.0 | 100.0 | 100.0 | 100.0 | 100.0 | 100.0 | 100.0 |

(j) Growth Behavior of Granules

Figure 26:
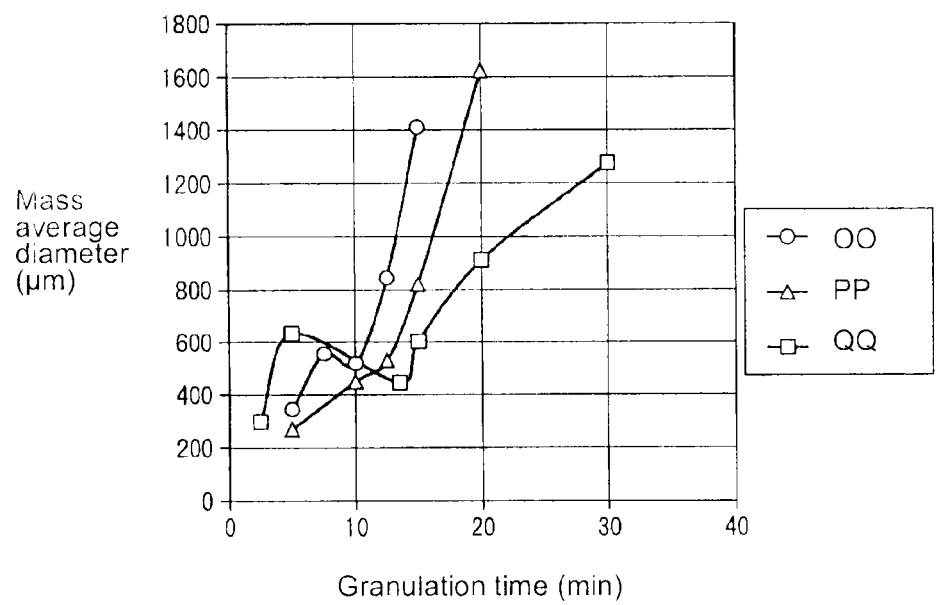
FIG. 26 is a graph showing a relation between the granulation time and the mass average diameter of granules in an Example and Comparative Examples.

In Example 4 and Comparative Examples 4 and 6, upon expiration of predetermined granulation times from the initiation of granulation, by means of the above-mentioned automatic sieving measuring device, the particle size distributions (based on mass) by a sieving method were measured, and the mass average diameters representing the mass cumulative median diameters upon expiration of the respective granulation times (elapsed times) were obtained. The results are shown in FIG. 26.

As the results in this Fig. show, it is evident that in Example 4 wherein ones having small average particle sizes were used as aluminum oxide and dolomite, growth of particles was fast as compared with Comparative Example 4 wherein the average particle size of aluminum oxide was large and Comparative Example 6 wherein the average particle sizes of aluminum oxide and dolomite were large. Further, among them, in Comparative Example 6, growth of particles was slowest.

Accordingly, in Example 4, granules having large D50 were obtained despite the short granulation time.

Further, when Example 3 and Example 4 in Tables 1 and 3 are compared, it is evident that in Example 3 wherein the amount of water added was smaller than in Example 4, D50 of the obtained granules was smaller despite the longer granulation time than in Example 4. This indicates that when the amount of water added is reduced, the growth rate tends to be slow.

3,001.0 g of glass raw materials and 488 g of water) was about 14 mass %.

The obtained granules were taken out from the granulator and dried in an amount of 400 g each time by means of a shelf dryer under conditions of 120° C. in air for 15 hours. The water content in the granules after drying was most 2 mass %.

TABLE 6

| | | D50 of raw material [μm] | D90 of raw material [μm] | Density of raw material [g/cm$^3$] | Reference Example 1 | |
|---|---|---|---|---|---|---|
| | | | | | Content ratio in all raw material (mass %) | Content ratio of water-insoluble components (vol %) |
| Silica sand | SiO$_2$ | 25.0 | 39.2 | 2.2 | 50.323 | 69.89 |
| Aluminum source | Al$_2$O$_3$-3 | 52.0 | 86.1 | 3.9 | 14.565 | 11.41 |
| Boron source | H$_3$BO$_3$ | 324.0 | 454.0 | 1.4 | 12.414 | |
| Magnesium source | Mg(OH$_2$) | 6.7 | 11.8 | 2.4 | 0.548 | 0.71 |
| | MgCl•6H$_2$O (clarifying agent) | About 3000 | | | 2.424 | |
| | MgSO$_4$•7H$_2$O (clarifying agent) | About 300 | | | 0.750 | |
| Magnesium source and alkaline earth metal source | Dolomite-2 | 27.7 | 78.7 | 2.9 | 9.312 | 9.98 |
| Alkaline earth metal source | SrCO$_3$ | 6.3 | 10.9 | 3.7 | 9.353 | 7.72 |
| | CaF$_2$ (Fluorite) | 19.6 | 47.8 | 3.2 | 0.289 | 0.28 |
| Iron source | Fe$_2$O$_3$ | 39.0 | 116.0 | 5.2 | 0.021 | 0.01 |
| Total | | | | | 100.0 | 100.0 |
| (a) Proportion of particles exceeding 50 μm in diameter of water-insoluble components [vol %] | | | | | | 9.86 |
| (b1) D50 of water-insoluble components [μm] | | | | | | 25.1 |
| (b2) D90 of water-insoluble components [μm] | | | | | | 51.2 |
| (c) D50 of granules [μm] | | | | | | About 1500 |
| Size of granulator (Eirich Intensive mixer) [L] | | | | | | 5 |
| Amount of raw material introduced into granulator [kg] | | | | | | 3.0 |
| Amount of water added [wt %] | | | | | | 14.0 |
| Granulation time [min] | | | | | | 11.0 |
| Particle size regulation time [min] | | | | | | 8.0 |
| Dryer | | | | | | Shelf dryer |
| Drying temperature [° C.] | | | | | | 120 |

Reference Example 1

(k) Measurement of Particle Sizes by Electron Probe Microanalyzer (EPMA)

Granules were produced in the composition as shown in Table 6. Preliminarily, an aqueous solution having 72.7 g of magnesium chloride and 22.5 g of magnesium sulfate dissolved in 488 g of water, was prepared.

Then, 2,905.8 g of the rest of raw materials excluding magnesium chloride and magnesium sulfate among the blend components shown in Table 6 was introduced into an Eirich mixer (tradename: R02) having a capacity of 5 L and mixed for 1 minute at a pan rotational speed of 60 rpm and at a rotor rotational speed of 900 rpm.

Figure 27:
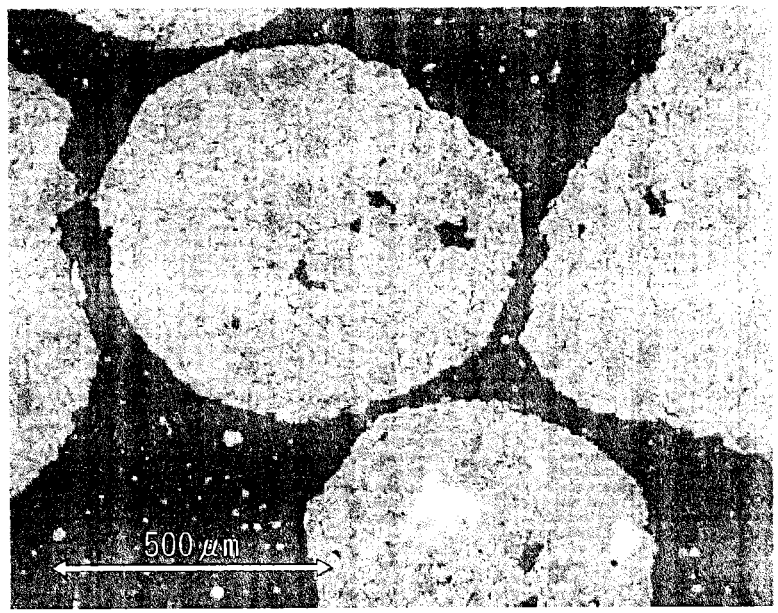
FIG. 27 is a scanning electron microscopic photograph of a cross-section of granules in Reference Example 1.
Figure 28:
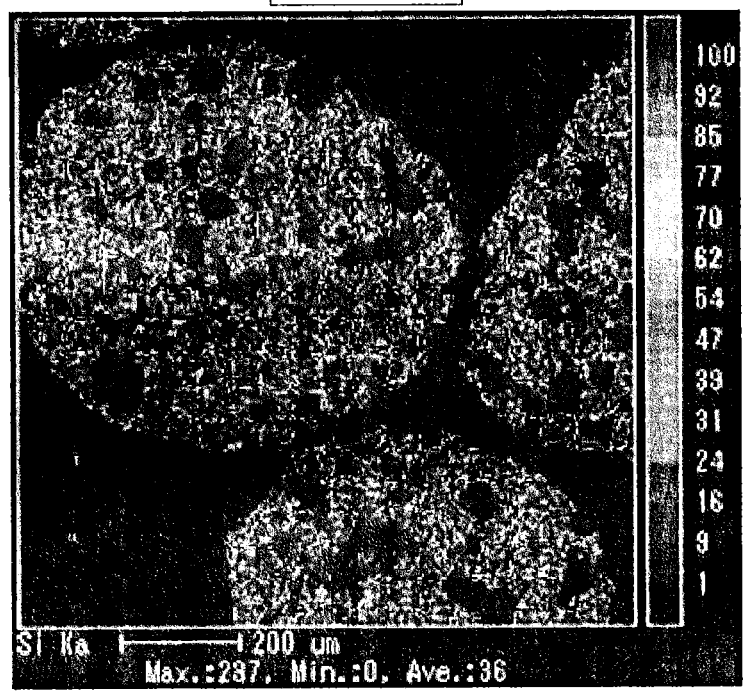
FIG. 28 is a mapped image of Si by EPMA element color mapping in the cross-section of granules in Reference Example 1.
Figure 29:
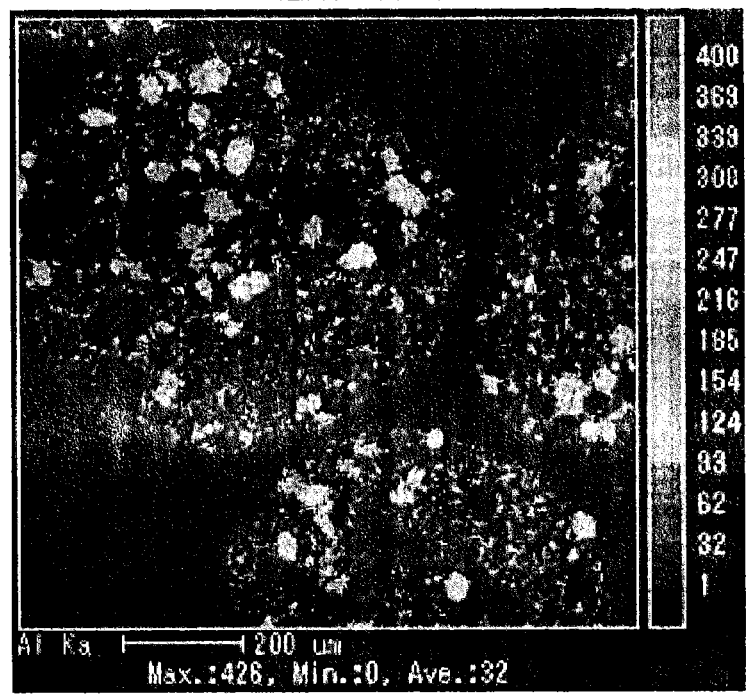
FIG. 29 is a mapped image of Al by EPMA element color mapping in the cross-section of granules in Reference Example 1.
Figure 30:
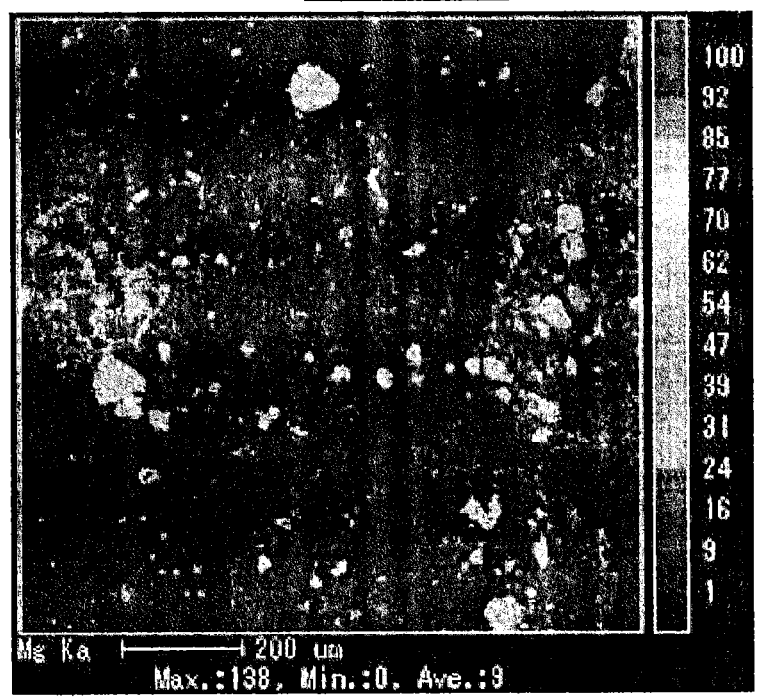
FIG. 30 is a mapped image of Mg by EPMA element color mapping in the cross-section of granules in Reference Example 1.
Figure 31:
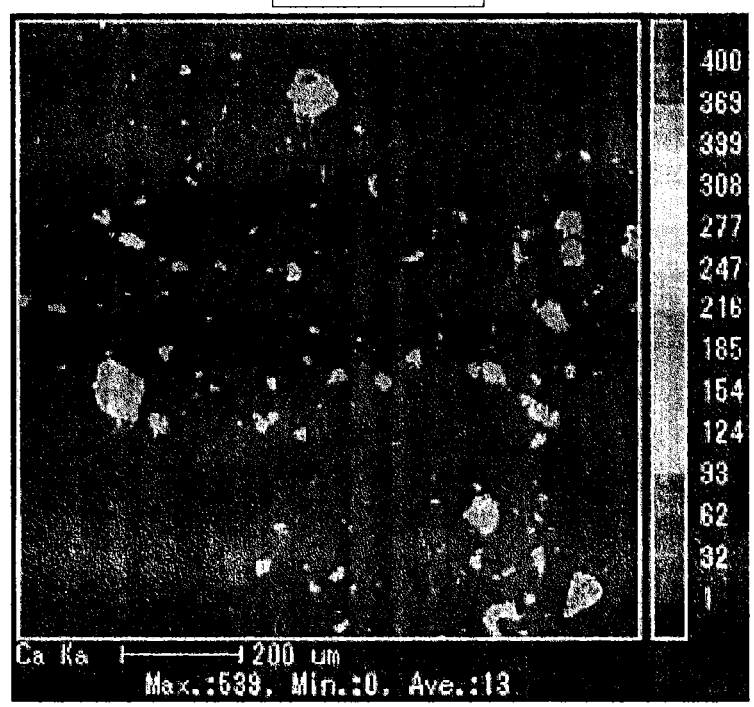
FIG. 31 is a mapped image of Ca by EPMA element color mapping in the cross-section of granules in Reference Example 1.

Then, 583.2 g of the above aqueous solution (solid content: 95.2 g, water: 488 g) was introduced, and the rotor rotational speed was raised to 3,000 rpm, whereupon granulation was carried out for 11 minutes, and then the rotor rotational speed was lowered to 900 rpm and particle size regulation was carried out for 1 minute. The proportion of water (amount of water added) in the total amount introduced (the total of With respect to granules after drying, an approximate average particle size was measured by using magnifying glass observation and a ruler. Further, the granules were embedded in a resin and then cut by a diamond cutter, whereupon the cross-section was observed by a scanning electron microscope (SEM) and further observed by EPMA to carry out color mapping measurements. The results are shown in FIGS. 27 to 31. FIG. 27 shows the SEM photograph, FIG. 28 the result of Si mapping, FIG. 29 the result of Al mapping, FIG. 30 the result of Mg mapping, and FIG. 31 the result of Ca mapping.

The measurement conditions for color mapping were as follows.

<Measurement Conditions>
Accelerating voltage: 15 kV
Beam current: 30 nA
Beam diameter: 2 μm
Measured area: 2 μm step, 512×512 pixel, a range of about 1,000 μm×1.000 μm, measuring time: 10 msec/point, measuring elements: Si, Al, Ca, Mg, Sr and B, apparatus used: EPMA-1610 (manufactured by Shimadzu Corporation)

For example, from the measurement results of Si color mapping, silica sand in granules is distinguished, and its particle sizes are measured by the above-described method and further converted to a volume-based particle size distribution. Such calculation treatments can be carried out by suitably using a conventional image treatment software. Thus, the particle size distribution (based on volume) of silica sand in the granules can be obtained.

INDUSTRIAL APPLICABILITY

The granules of the present invention are useful as raw material for the production of aluminosilicate glass.

What is claimed is:

1. Granules, comprising:
    silica sand; and
    aluminum oxide;
    wherein:
    when the granules are dried to a water content at most 2 mass % are subjected to screening using a sieve having 1 mm openings, a first volume cumulative median diameter D50(c) in a first particle size distribution curve of particles that pass through the sieve is from 350 to 1,000 μm;
    in a second particle size distribution curve of water-insoluble components of the granules, a proportion of particles exceeding 50 μm in diameter is at most 6 vol %;
    in the second particle size distribution curve of water-insoluble components of the granules, a 90% volume cumulative particle diameter D90(b2) from a smaller particle size side is at most 45 μm; and
    a ratio of D90(b2) to a 50% volume cumulative particle diameter D50(b1) from the smaller particle size in the second particle size distribution curve of water-insoluble components of the granules, D90(b2)/D50(b1), is at most 1.9.

2. The granules according to claim 1, wherein a filling rate of the granules is at least 75% as measured by mercury intrusion technique.

3. The granules according to claim 1, wherein a bulk density of the granules is at least 1.1 g/ml.

4. A process for producing granules, comprising:
    mixing at least silica sand and aluminum oxide to obtain a glass raw material mixture; and
    granulating, without pulverizing, the glass raw material mixture;
    wherein:
    when the granules are dried to a water content at most 2 mass % and are subjected to screening using a sieve having 1 mm openings, a first volume cumulative median diameter D50(c) in a first particle size distribution curve of particles that pass through the sieve is from 350 to 1,000 μm;
    in a second particle size distribution curve of water-insoluble components of the granules, a proportion of particles exceeding 50 μm in diameter is at most 6 vol %;
    in the second particle size distribution curve of water-insoluble components of the granules, a 90% volume cumulative particle diameter D90(b2) from a smaller particle size side is at most 45 μm; and
    a ratio of D90(b2) to a 50% volume cumulative particle diameter D50(b1) from the smaller particle size in the second particle size distribution curve of water-insoluble components of the granules, D90(b2)/D50(b1), is at most 1.9.

5. The process for producing granules according to claim 4, wherein granulating the glass raw material mixture comprises performing a tumbling granulation method.

6. A method for producing a glass product, comprising:
    producing granules by the process according to claim 4; and
    melting the granules to form molten glass; and
    forming a glass product from the molten glass.

7. The method for producing a glass product according to claim 6, wherein the glass product comprises:
    50 to 60 mass % $SiO_2$;
    15 to 20 mass % $Al_2O_3$;
    6 to 10 mass % $B_2O_3$;
    2 to 6 mass CaO;
    1 to 5 mass % MgO;
    0.01 to 0.1 mass % $Fe_2O_3$; and
    5 to 10 mass % SrO.

8. The method for producing a glass product according to claim 7, wherein the glass raw material mixture comprises, as water-insoluble components:
    65 to 75 vol % of silica sand ($SiO_2$) having a D50 of 1 to 30 μm;
    7 to 15 vol % of aluminum oxide having a D50 of 1 to 7 μm;
    0.1 to 10 vol % of magnesium hydroxide having a D50 of 3 to 11 μm;
    5 to 15 vol % of dolomite having a D50 of 5 to 20 μm;
    3 to 15 vol % of strontium carbonate having a D50 of 2 to 10 μm;
    0.1 to 2 vol % of fluorite ($CaF_2$) having a D50 of 5 to 30 μm; and
    0.001 to 0.1 vol % of iron oxide ($Fe_2O_3$) having a D50 of 5 to 50 μm.

9. The granules according to claim 1, wherein the ratio of D90(b2) to D50(b1), D90(b2)/D50(b1), is at most 1.8.

10. The process according to claim 4, wherein the ratio of D90(b2) to D50(b1), D90(b2)/D50(b1), is at most 1.8.

* * * * *